US011817791B2

(12) United States Patent
Iorio et al.

(10) Patent No.: US 11,817,791 B2
(45) Date of Patent: Nov. 14, 2023

(54) SYNCHRONOUS RECTIFIER DRIVER CIRCUIT, RELATED INTEGRATED CIRCUIT, ELECTRONIC RESONANT CONVERTER AND METHOD

(71) Applicants: STMicroelectronics S.r.l., Agrate Brianza (IT); STMicroelectronics Design and Application S.R.O., Prague (CZ)

(72) Inventors: Alberto Iorio, Aosta (IT); Maurizio Foresta, Aosta (IT); Emilio Volpi, Charvensod (IT); Jan Novotny, Tyn nad Vltavou (CZ)

(73) Assignees: STMicroelectronics S.r.l., Agrate Brianza (IT); STMicroelectronics Design and Application S.R.O., Prague (CZ)

( * ) Notice: Subject to any disclaimer, the term of this patent is extended or adjusted under 35 U.S.C. 154(b) by 30 days.

(21) Appl. No.: 17/490,793

(22) Filed: Sep. 30, 2021

(65) Prior Publication Data

US 2022/0109375 A1 Apr. 7, 2022

(30) Foreign Application Priority Data

Oct. 6, 2020 (IT) .................. 102020000023497

(51) Int. Cl.
*H02M 3/335* (2006.01)
*H02M 1/08* (2006.01)
(Continued)

(52) U.S. Cl.
CPC ..... *H02M 3/33592* (2013.01); *H02M 1/0058* (2021.05); *H02M 3/01* (2021.05); *H02M 1/08* (2013.01)

(58) Field of Classification Search
CPC .......... H02M 1/0058; H02M 1/08-088; H02M 1/38; H02M 3/01; H02M 3/33569; H02M 3/33571; H02M 3/33576; H02M 3/33592
See application file for complete search history.

(56) References Cited

U.S. PATENT DOCUMENTS 5,736,890 A * 4/1998 Yee ...................... H02M 7/217
327/423
8,067,973 B2 11/2011 Bakker
(Continued)

FOREIGN PATENT DOCUMENTS

CN 103683953 A 3/2014

OTHER PUBLICATIONS

K. J. Åström and T. Hägglund, "PID Control" and "Implementation" in Advanced PID Control, Research Triangle Park, NC, USA: ISA Society, 2006, ch. 3, pp. 64-94 and ch. 13, pp. 407-432 (Year: 2006).*

(Continued)

*Primary Examiner* — Fred E Finch, III
(74) *Attorney, Agent, or Firm* — SEED IP LAW GROUP LLP

(57) ABSTRACT

A synchronous rectifier driver circuit is configured to drive a synchronous rectifier FET and includes a first terminal configured to be connected to a source terminal of the synchronous rectifier FET. A second terminal is configured to be connected to a drain terminal of the synchronous rectifier FET, and a third terminal is configured to be connected to a gate terminal of the synchronous rectifier FET. The synchronous rectifier driver circuit is configured to measure the voltage between the second terminal and the first terminal, and detect a switch-on instant in which the measured voltage reaches a first threshold value and a switch-off instant in which the measured voltage reaches a second threshold value. The synchronous rectifier driver (Continued)

circuit generates a drive signal between the third terminal and the first terminal as a function of the measured voltage.

16 Claims, 11 Drawing Sheets

(51) Int. Cl.
*H02M 3/00* (2006.01)
*H02M 1/00* (2006.01)

(56) References Cited

U.S. PATENT DOCUMENTS

| | | |
|---|---|---|
| 9,929,659 B2 | 3/2018 | Foresta et al. |
| 10,079,549 B1* | 9/2018 | Chu ............... H02M 3/33592 |
| 10,361,636 B2* | 7/2019 | Lin ................ H02M 3/33592 |
| 2009/0273951 A1 | 11/2009 | Ren et al. |
| 2015/0370295 A1 | 12/2015 | Luo et al. |
| 2016/0226389 A1 | 8/2016 | Quaglino et al. |
| 2017/0085188 A1 | 3/2017 | Foresta et al. |
| 2017/0244333 A1* | 8/2017 | Choi ..................... H02M 1/08 |
| 2019/0393794 A1* | 12/2019 | Feng ..................... H03K 17/18 |
| 2020/0204080 A1* | 6/2020 | Zhang ............. H02M 3/33592 |
| 2021/0226548 A1* | 7/2021 | Chen ..................... H02M 1/08 |
| 2021/0376709 A1* | 12/2021 | Zong ..................... H02M 1/08 |
| 2023/0135356 A1 | 5/2023 | Tan |

OTHER PUBLICATIONS

Kozacek, B. et al., "Analysis of Figure Of Merit—power transistor's qualitative parameter," 2015 16th International Scientific Conference on Electric Power Engineering (EPE), 5 pages.

Pan, S. et al., "Adaptive Hybtid Primary/Secondary-Side Digital Control for Series Resonant DC-DC Converters in 48 V VR Applications," *IEEE Journal of Emerging and Selected Topics in Power Electronics*, vol. 3, No. 2, Jun. 2015, pp. 422-429.

Wang, J. et al., "Research on Key Application Issues of Smart Synchronous Rectifier Driver IC in LLC Resonant Converter," *2011 IEEE Energy Conversion Congress and Exposition*, pp. 2765-2770.

\* cited by examiner

SYNCHRONOUS RECTIFIER DRIVER CIRCUIT, RELATED INTEGRATED CIRCUIT, ELECTRONIC RESONANT CONVERTER AND METHOD

BACKGROUND

Technical Field

The embodiments of the present description refer to a synchronous rectifier driver circuit for two synchronous rectifier switches, such as synchronous rectifier switches of a switching resonant converter.

Description of the Related Art

Resonant converters are a wide range of switching converters characterized by the presence of a resonant circuit playing an active role in determining the input-output power flow. Considering the most common implementations, in these converters, a full-bridge (or half bridge) consisting of four (or two) power switches (typically power Field Effect Transistors, FET, such as Metal-Oxide-Semiconductor Field-Effect Transistors, MOSFET), supplied by a direct voltage generates a voltage square wave that is applied to a resonant circuit tuned to a frequency close to the fundamental frequency of said square wave. Thereby, because of the selective features thereof, the resonant circuit mainly responds to the fundamental component and negligibly to the higher-order harmonics of the square wave.

As a result, the circulating power may be modulated by changing the frequency of the square wave, while holding the duty cycle constant at 50%. Moreover, depending on the resonant circuit configuration, the currents and/or voltages associated with the power flow have a sinusoidal or a piecewise sinusoidal shape.

These voltages are rectified and filtered so as to provide DC power to a load. In offline applications, to comply with safety regulations, the rectification and filtering system supplying the load is coupled often to the resonant circuit via a transformer providing the isolation between source and load, required by the above-mentioned regulations. As in all isolated network converters, also in this case a distinction is made between a primary side (as related to the primary winding of the transformer) connected to the input source and a secondary side (as related to the secondary winding(s) of the transformer) providing power to the load through the rectification and filtering system.

Presently, among the many types of resonant converters, the so-called LLC resonant converter is widely used, especially in the half bridge version thereof. The designation LLC comes from the resonant circuit employing two inductances/inductors (L) and a capacitor (C).

BRIEF SUMMARY

Considering the foregoing, various embodiments of the present disclosure provide a new driver circuit for two synchronous rectifier switches, which in particular deals with the switch-off condition for the synchronous rectifier switches.

According to one or more embodiments, one or more of the above technical benefits are achieved by a synchronous rectifier driver circuit having the distinctive elements set forth herein. Embodiments moreover concern a related integrated circuit, electronic resonant converter and method.

The claims form an integral part of the technical teaching of the description provided herein.

As mentioned before, various embodiments of the present disclosure relate to a synchronous rectifier driver circuit configured to drive a synchronous rectifier FET comprising a drain, a source and a gate terminal. In various embodiments, the synchronous rectifier driver circuit, e.g., in the form of an integrated circuit, comprises a first terminal configured to be connected to the source terminal of the synchronous rectifier FET, a second terminal configured to be connected to the drain terminal of the synchronous rectifier FET and a third terminal configured to be connected to the gate terminal of the synchronous rectifier FET.

In various embodiments, the synchronous rectifier driver circuit is configured to measure the voltage between the second terminal and the first terminal, and detect a switch-on instant where the measured voltage reaches a first threshold value and a switch-off instant where the measured voltage reaches a second threshold value.

In various embodiments, the synchronous rectifier driver circuit is configured to generate a drive signal between the third terminal and the first terminal as a function of the measured voltage by:

between a further instant and the switch-off instant, varying the drive signal as a function of the instantaneous value of the measured voltage; and between the switch-off instant and the next switch-on instant, setting the drive signal to a second value.

In various embodiments, the synchronous rectifier driver circuit may be configured to also vary the drive signal as a function of the instantaneous value of the measured voltage between the switch-on instant and the further instant. Alternatively, the synchronous rectifier driver circuit may be configured to set the drive signal to a second value between the switch-on instant and the further instant. For example, the further instant may be determined by determining an instant where the measured voltage reaches a peak value between the switch-on instant and the switch-off instant;

waiting a given time with respect to the switch-on instant; or determining an instant where the measured voltage reaches a given threshold value.

For example, in various embodiments, the instant where the measured voltage reaches the peak value may be determined by determining the duration between a previous switch-on instant and a respective previous switch-off instant and estimating the further instant at half of this duration.

According to a first aspect, the synchronous rectifier driver circuit may be configured to vary the drive signal between the further instant and the switch-off instant by setting the drive signal to a voltage corresponding to the sum of a constant voltage and a voltage proportional with a given proportionality constant to the instantaneous value of the measured voltage.

In various embodiments, the synchronous rectifier driver circuit comprises a sample-and-hold circuit configured to store the peak value. In this case, the synchronous rectifier driver circuit may be configured to determine the second value as a function of the stored peak value. For example, the second value may correspond to the sum of a constant voltage and a voltage proportional with the given proportionality constant to the stored peak value.

For example, in various embodiments, the synchronous rectifier driver may comprise a fourth terminal and a variable current generator configured to generate a variable current applied to the fourth terminal, wherein the variable current is proportion to a voltage received at an input of the variable current generator. Accordingly, a control circuit may be configured to connect the input of the variable current generator to:

the stored peak value between the switch-on instant and the further instant, the measured voltage between the further instant and the switch-off instant, or the first terminal between the switch-off instant and the next switch-on instant.

As will be explained in greater detail in the following, in various embodiments, the voltage at the fourth terminal may be used to directly generate the drive signal for the gate terminal of the synchronous rectifier driver, e.g., via a voltage follower.

However, in various embodiments, the synchronous rectifier driver circuit may comprise also a fifth terminal, a constant current generator configured to generate a constant current applied to the fifth terminal, and a summation circuit configured to generate the drive signal by summing the voltage at the fourth terminal and the voltage at the fifth terminal.

According to a second aspect, the synchronous rectifier driver circuit may be configured to vary the drive signal between the further instant and the switch-off instant in order to directly regulate the measured voltage to a given (constant) reference value. For example, for this purpose, the synchronous rectifier driver circuit may comprise a regulator circuit configured to receive the measured voltage and the given reference value, and generate a regulation signal. Specifically, in various embodiments, the regulator circuit comprises or implements at least an Integral component. Accordingly, in this case, the drive signal may be determined (at least) between the further instant and the switch-off instant as a function of (or may correspond to) the regulation signal.

Various embodiments relate also to an electronic resonant converter comprising:

two input terminals for receiving an input voltage and two output terminals for providing an output voltage or output current;

a transformer comprising a primary winding and a first and a second secondary winding;

a switching stage connected via a resonant tank to the primary winding;

a first synchronous rectifier FET connected in series with the first secondary winding between the two output terminals;

a second synchronous rectifier FET connected in series with the second secondary winding between the two output terminals; and two synchronous rectifier driver circuits as described herein.

BRIEF DESCRIPTION OF THE DRAWINGS

The embodiments of the present disclosure will now be described with reference to the drawings, which are provided purely to way of non-limiting example and in which.

The features and advantages of the present disclosure will become apparent from the following detailed description of practical embodiments thereof, shown by way of non-limiting example in the accompanying drawings, in which.

DETAILED DESCRIPTION

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment", "in one embodiment", or the like that may be present in various points of this description do not necessarily refer to one and the same embodiment. Moreover, particular conformations, structures, or characteristics may be combined in any adequate way in one or more embodiments.

The references used herein are only provided for convenience and hence do not define the sphere of protection or the scope of the embodiments.

Figure 1:
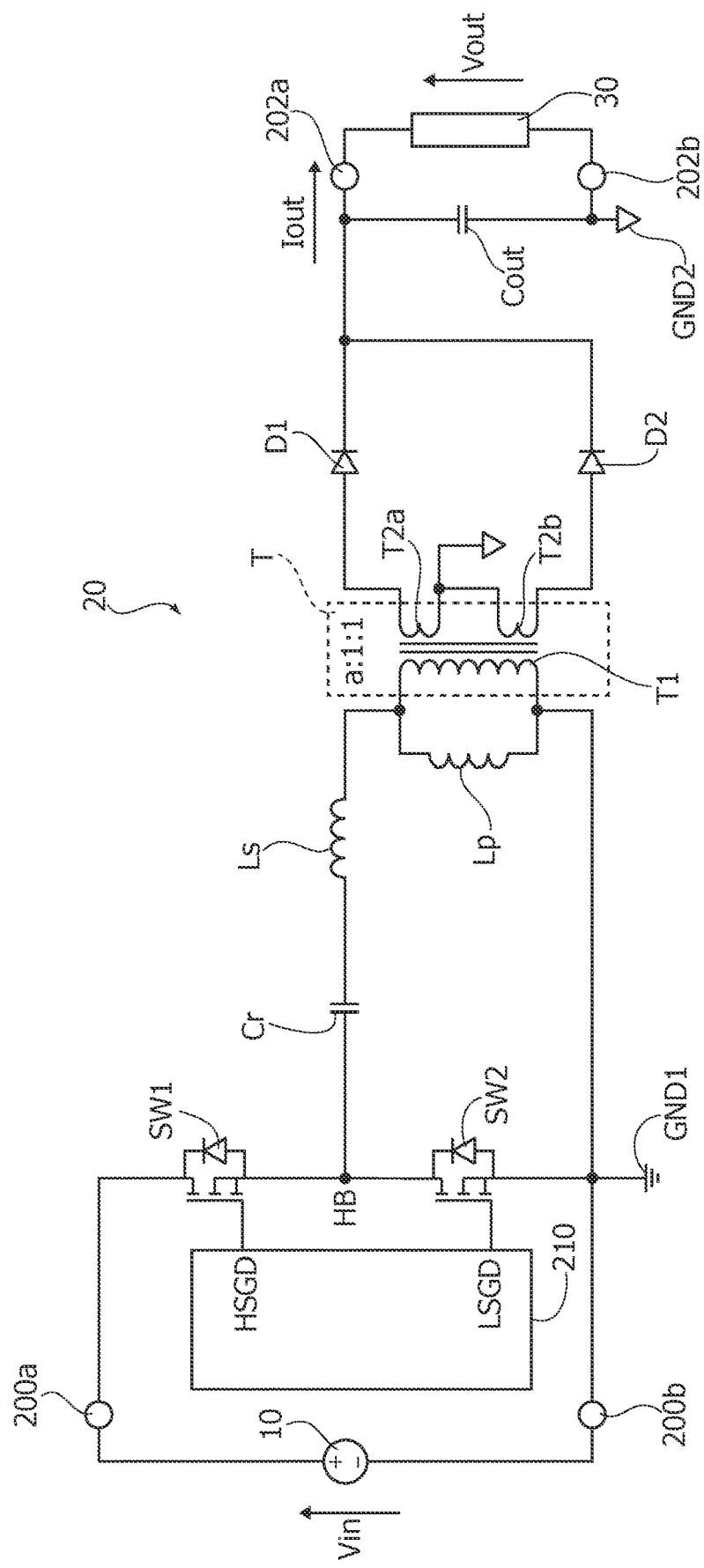
FIG. 1 shows a circuit schematic of an LLC resonant converter in accordance with a comparative example.

FIG. 1 shows an example of an LLC resonant converter 20. In general, an electronic converter 20 comprises:

a positive input terminal 200a and a negative input terminal 200b for receiving a DC input voltage Vin; and a positive output terminal 202a and a negative output terminal 202b for providing a regulated (DC) output voltage Vout or output current Iout.

For example, the input voltage Vin may be provided by a DC voltage generator 10, such as a battery. However, the input voltage Vin may also be obtained from an AC voltage, e.g., by means of a rectifier circuit, such as a bridge rectifier, and an optional filter circuit, such as a capacitor. Conversely, the regulated output voltage Vout or output current Iout may be used to supply a load 30.

In the example considered, the electronic converter 20 comprises a half bridge comprising two electronic switches SW1 and SW2, such as FET, such as n-channel FET, e.g., NMOS, connected (e.g., directly) in series between the input terminals 200a and 200b, wherein the negative input terminal 200b usually represents a first ground GND1. For example, in the example considered, the drain terminal of the transistor SW1 is connected directly to the terminal 200a, the source terminal of the transistor SW1 is connected directly to the drain terminal of the transistor SW2 and the source terminal of the transistor SW2 is connected directly to the terminal 200b.

Accordingly, the half-bridge SW1, SW2 is supplied via the input voltage Vin and the intermediate node between the electronic switches SW1 and SW2 (e.g., the drain terminal of the transistor SW1) represents a switching node HB.

In the example considered, the switching node HB between the electronic switches SW1 and SW2 is connected to a (resonant) circuit block.

Specifically, in the example considered, this circuit comprises a transformer T comprising a primary winding T1 and a central tapped secondary winding comprising a first secondary winding T2a and a second secondary winding T2b connected in series.

In the example considered, the primary winding T1 of the transformer T is connected (e.g., directly) with a capacitor Cr and a first inductance Ls between the switching node HB and the negative terminal 200b. Moreover, a second inductance Lp is connected (e.g., directly) in parallel with the primary winding T1. Thus, in the example considered the capacitor Cr, the first inductance Ls and the second inductance Lp are connected in series (from which derives the naming LLC converter), and the inductance Lp is connected in parallel to the primary winding T1. For example, in FIG. 1, a first terminal of the capacitor Cr is connected (e.g., directly) to the switching node HB, a second terminal of the capacitor Cr is connected (e.g., directly) via the inductance Ls to a first terminal of the primary winding T1 and a second terminal of the primary winding T1 is connected (e.g., directly) to the terminal 200b.

In a real transformer T, anyway, the two windings T1 and T2 are not perfectly coupled, and a transformed T comprises also a leakage inductance and a magnetizing inductance. Substantially, such a leakage inductance may be modelled via an inductance connected in series with the primary winding T1. Conversely, the magnetizing inductance of the transform T (used to model the magnetic flux) may be modelled with an inductance connected in parallel with the primary winding T1. Thus, the inductance Ls may consist in the leakage inductance of the transformer T, may be implemented with an inductor connected in series with the primary winding T1, or may result from both the leakage inductance of the transformer T and such an inductor. Similarly, the inductance Lp may consist in the magnetizing inductance of the transformer T, may be implemented with an inductor connected in parallel with the primary winding T1, or may result from both the magnetizing inductance of the transformer T and such an inductor. Thus, in general, the inductances Lp an Ls and the transformer T may be integrated in a single component.

As mentioned before, in FIG. 1 is used a center-tap arrangement on the secondary side, i.e., the secondary winding comprises a first, a second and a center-tap terminal. Specifically, in the example considered, the center-tap terminal is connected (e.g., directly) to one of the output terminals 202a/202b, and the first and second terminal of the secondary winding T2 are connected (e.g., directly) via a respective diode D2 and D1 to the other output terminal 202a/202b. For example, in the example considered, the center-tap terminal is connected (e.g., directly) to the output terminals 202b, and the first and second terminal of the secondary winding T2 are connected (e.g., directly) to the anodes of respective diodes D1 and D2 and the cathodes of the diodes D1 and D2 are connected (e.g., directly) to the terminal 202a. Accordingly, due to the rectification function of the diodes D1 and D2, the terminal 202a corresponds to the positive output terminal and the terminal 202b corresponds to the negative output terminal, which usually corresponds to a second ground GND2. However, by inverting the orientation of the diodes D1 and D2, the terminal 202b would correspond to the positive output terminal.

Often, the electronic converter 20 may also comprise an output filter connected between the rectifier and the output terminals 202a and 202b. For example, in FIG. 1 a capacitor Cout is connected (e.g., directly) between the output terminals 202a and 202b.

In the example considered, the control terminals, e.g., the gate terminals of respective FETs, of the electronic switches SW1 and SW2 are driven via a driver circuit 210, which is configured to generate respective drive signals HSGD and LSGD for the electronic switches SW1 and SW2.

As mentioned before, the driver circuit 210 drives the switches SW1 and SW2 usually in order to apply a square wave at a frequency close to that of the resonant circuit to the switching node HB. In this way the resonant tank (Lp, Ls and Cr) behaves as a tuned filter and the current is formed by the single fundamental harmonic of the Fourier series development therefore practically sinusoidal.

More specifically, the driver circuit 210 is often configured to generate the drive signals HSGD and LSGD in order to repeat the following four phases for each switching cycle:

during a first time-interval, closing the first electronic switch SW1 and opening the second electronic switch SW2, whereby the switching node HB is connected to the positive input node 200a, i.e., the input voltage Vin;

during a second time-interval, opening both the first and the second electronic switch SW1/SW2;

during a third time-interval, opening the first electronic switch SW1 and closing the second electronic switch SW2, whereby the switching node HB is connected to the negative input node 200a, e.g., ground GND1; and during a fourth time-interval, opening both the first and the second electronic switch SW1/SW2.

The second and fourth time-interval may be useful in order to use the resonances of resonant circuit in order to achieve soft switching. For example, the LLC topology shown in FIG. 1 permits a ZVS (Zero Voltage Switching) of the switches SW1 and SW2 on the primary side and a ZCS (Zero Current Switching) of the diodes D1 and D2 on the secondary side, which thus permits to operate the converter at high switching frequencies with high efficiency.

Thus, in the example considered, the electronic converter provides via the output terminals 202a and 202b a voltage Vout and a current Iout. Often a closed-loop (usually implemented with a negative-feedback control system) keeps thus either the output voltage Vout or the output current Iout of the converter constant upon changing the operating conditions, e.g., variation of the input voltage Vin and/or the output load 30. As mentioned before, the regulation of the converter output voltage Vout or the output current Iout is achieved by changing the switching frequency of the square waveform at the switching node HB/the input of the resonant tank.

Figure 2:
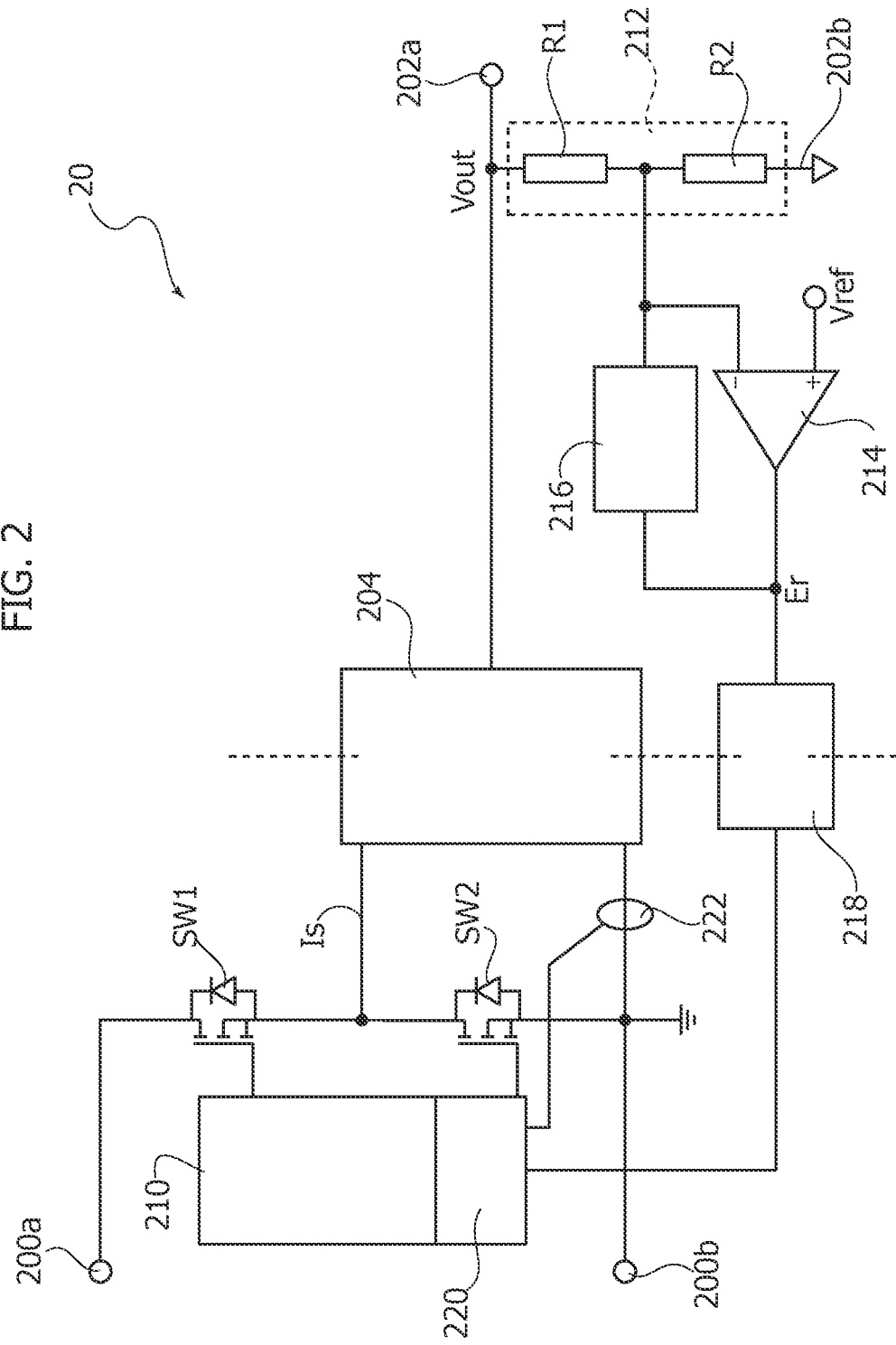
FIG. 2 shows a block diagram of a control circuit for the resonant converter of FIG. 1.

For example, FIG. 2 shows an example of a control circuit for a generic half-bridge resonant converter 20.

As mentioned before, a half-bridge resonant converter 20 comprises a half-bridge comprising two electronic switches connected in series between the input terminals 200a and 200b of the electronic converter 20. Moreover, the converter 20 comprises a circuit 204 comprising a resonant tank (e.g., capacitor Cr, inductances Ls and Lp, and transformer T), a rectifier circuit (e.g., diodes Da and Db) and an optional filter circuit (e.g., capacitor Cout). Specifically, the circuit 204 is connected on one side to the switching node HB (between the electronic switches SW1 and SW2) and the negative input terminal 200b (or alternatively the positive input terminal 200a) in order to receive a substantially square wave signal, and on the other side to the output terminals 202a and 202b in order to provide an output voltage Vout or output current Iout.

In order to implement a closed loop control, the converter 20 comprises a sensor 212 configured to monitor the output voltage Vout (for a voltage source) or output current Iout (for a current source). For example, in FIG. 2, the converter 20 is configured to provide a regulated voltage. Accordingly, the sensor 212 may be a voltage sensor configured to monitor the output voltage Vout. For example, in FIG. 2 is used a voltage divider comprising two resistors R1 and R2 connected between the terminals 202a and 202b, whereby the voltage sensor provides a measurement signal proportional to the output voltage Vout.

The measurement signal (indicative of the current Iout or voltage Vout) provided by the sensor 212 is provided to an error amplifier configured to generate an error signal Er. For example, the error amplifier may compare the measurement signal with a reference signal, such as a reference voltage Vref, and generate an error signal Er indicative of the difference between the measurement signal and the reference voltage Vref.

In the example considered, the error signal Er is then provided to the driver circuit 210 in order to modify a given control quantity x, wherein the energy transferred during each switching cycle substantially depends on the control quantity x (e.g., the switching frequency of the switches SW1 and SW2) Generally, the error signal Er may be provided directly to the driver circuit 210 or indirectly, e.g., via an optocoupler 218 (which is usually used in case of isolated electronic converters). Moreover, the error signal Er or a signal indicative of (e.g., proportional to) the error signal Er (e.g., in case an optocoupler 218 is also used) provided to the driver circuit 210 may be any suitable control signal, such as a voltage Vc or a current Ic.

Often, the error amplifier is implemented with an operational amplifier 214 receiving at input the measurement signal (e.g., at the inverting/negative input) and the reference signal (e.g., at the non-inverting/positive input). Moreover, the operation amplifier 214 has associated a feedback network 216 connected between the output of the operation amplifier and one of the input terminals (usually the inverting input terminal). For example, the feedback network 216 may comprise components for implementing the error amplifier as a regulator having a proportional (P) component (e.g., via resistor) and/or an integrative (I) component (e.g., via a capacitor). Thus, in general, the feedback network 216 implements a filter of the error amplifier. For example, such a filter 216 may be useful in order to select an appropriate frequency response of the error amplifier, e.g., in order to ensure:
  a stable control loop (i.e., that, upon disturbances of the operating conditions of the converter, once the transient caused by the disturbance has subsided, the output parameter Vout/Iout tends to recover a constant steady state;
  a good regulation (i.e., the new constant value recovered by the output parameter Vout/Iout following a disturbance is very close to that preceding the perturbation); and
  a good dynamic performance (i.e., during the transient following a disturbance, the output parameter Vout/Iout does not excessively deviate from the desired value and the transient itself is short).

Figure 3:
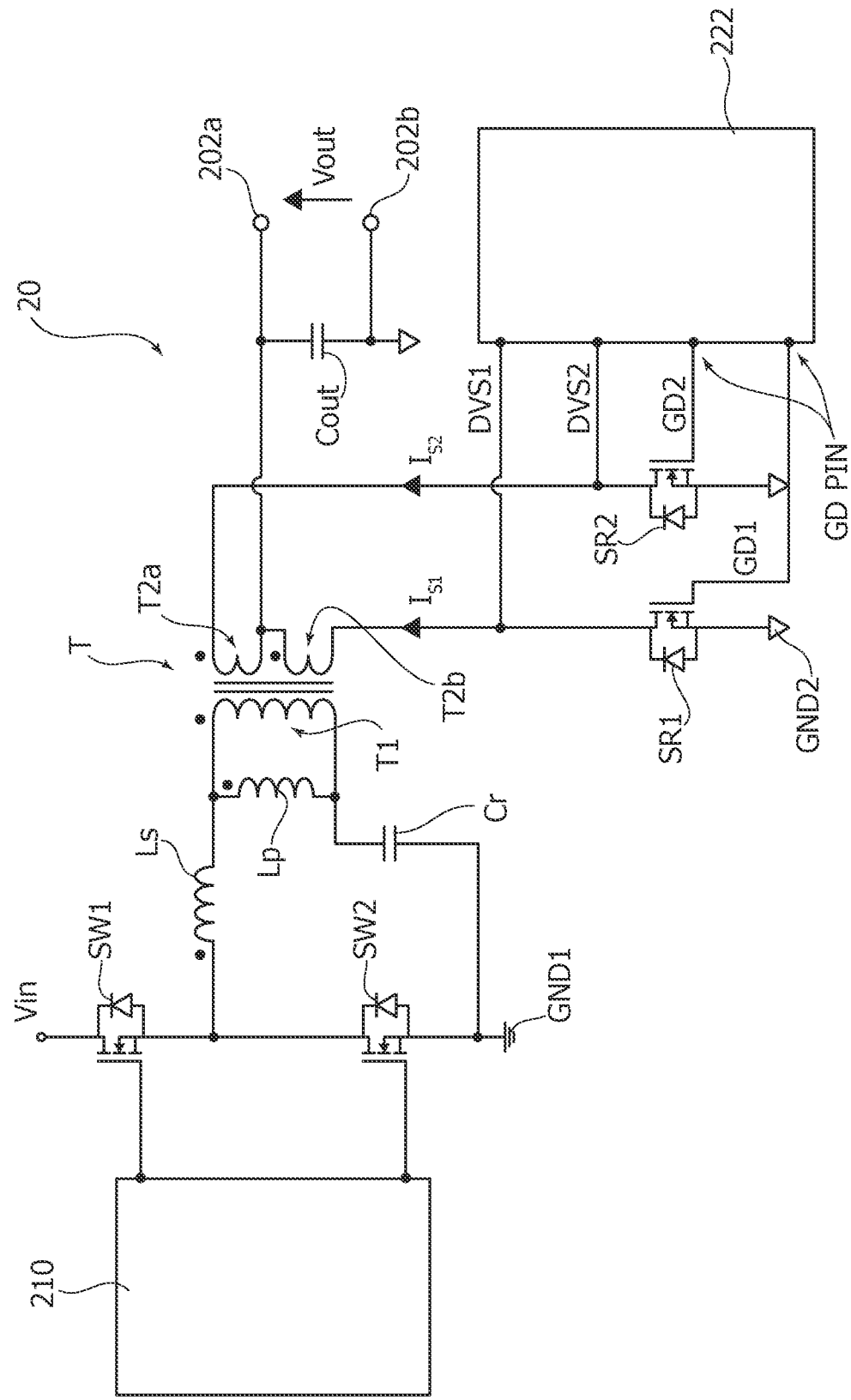
FIG. 3 shows a circuit schematic of an LLC resonant converter comprising a synchronous rectifier comprising two synchronous rectifier switches and a synchronous rectifier driver circuit.

As shown in FIG. 3, in order to improve the efficiency of resonant converters, the diodes D1 and D2 on the secondary side (FIG. 1) are often replaced with synchronous rectifier (SR) electronic switches SR1 and SR2, which are controlled by a synchronous rectifier driver 222 to emulate an ideal diode.

In order to simplify a driving of the synchronous rectifier switches SR1 and SR2, one of the terminals of each synchronous rectifier switches SR1 and SR2 is usually connected to ground (e.g., GND2 for an isolated converter.

For example, in FIG. 3, the synchronous rectifier electronic switches are implemented with n-channel FET, such as MOSFET.

Accordingly, in FIG. 3, also remaining connection at the secondary side has changed, i.e.:
  center-tap terminal of the transformer T is connected (e.g., directly) to the (positive) output terminal (202a);
  the first terminal of the secondary winding T2 (terminal of the winding T2a) is connected (e.g., directly) to a first (drain) terminal of the synchronous rectifier FET SR2, and a second (source) terminal of the synchronous rectifier switch SR2 is connected (e.g., directly) to the (negative) terminal 202b, which represents a ground GND2; and
  the second terminal of the secondary winding T2 (terminal of the winding T2b) is connected (e.g., directly) to a first (drain) terminal of the synchronous rectifier FET SR1, and a second (source) terminal of the synchronous rectifier switch SR1 is connected (e.g., directly) to the (negative) terminal 202b.

Again, a capacitor Cout may be connected (e.g., directly) between the output terminals 202a and 202b.

FIG. 3 shows also that the capacitor Cr may not be connected between the primary winding T1 and the switching node HB, but between the primary winding T1 and the terminal 200b, e.g., ground GND1.

The core function of synchronous rectifier driver 222 is to switch on each synchronous rectifier switch SR1 and SR2 whenever the corresponding transformer half winding T2a or T2b starts conducting.

Specifically, when using FETs, each of the synchronous rectifier switches SR1 and SR2 has also associated a body diode. In general, each synchronous rectifier switches SR1 and SR2 may thus have associated (in particular connected in parallel) a diode. Accordingly, in this case, the synchronous rectifier driver 222 should switch-on a given synchronous rectifier switch SR1 and SR2 when the respective diode starts conducting and t switch-off the synchronous rectifier switch when the flowing current approaches zero.

In order to achieve high efficiency, the rectifier driver 222 may also control the channel conduction time, trying to minimize the diode conduction time.

Several techniques have been proposed to control synchronous rectifier switches SR1 and SR2 for (e.g., LLC) resonant converters. The solutions can be grouped in two types: voltage driven and current driven control. The latter group uses the currents $I_{SR1}$ and $I_{SR2}$ flowing through the synchronous rectifier switches SR1 and SR2. Generally, the currents $I_{SR1}$ and $I_{SR2}$ may be measured directly via one or more current sensors connected in series with the synchronous rectifier switches SR1 and SR2, or may be estimated by measuring the current flowing through the primary side via a current transformer. Both cases can reach a high accuracy at the expense of extra components; and requires a large size current transformer impacting efficiency.

The voltage driven solutions are based on the measurement of the voltages DVS1 and DVS2 between the terminals of the current path of the synchronous rectifier switches SR1 and SR2, e.g., between the drain and source terminals of respective FETs.

Figure 4:
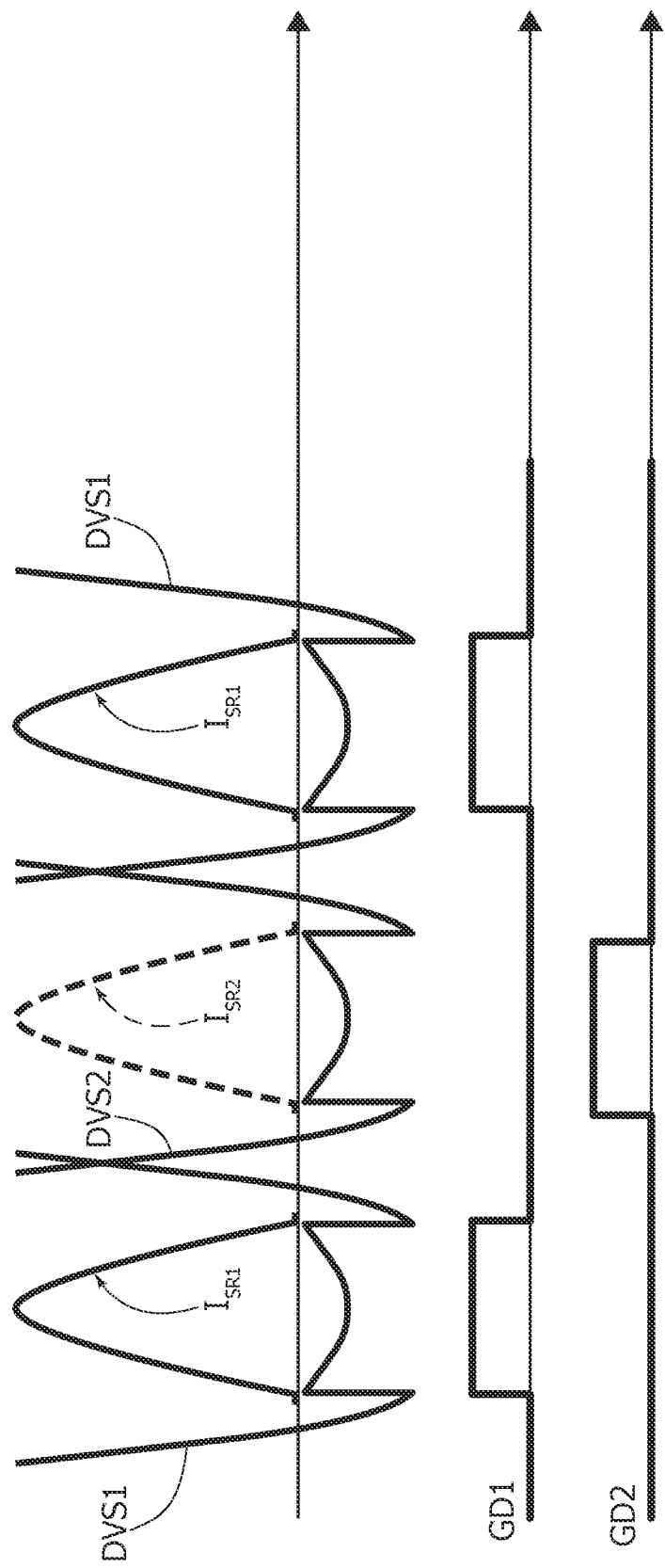
FIGS. 4 and 5 show typical waveforms of the operation of the synchronous rectifier driver circuit of FIG. 3.

For example, FIG. 4 shows possible waveforms of the currents $I_{SR1}$ and $I_{SR2}$ flowing through the synchronous rectifier switches SR1 and SR2 and the voltages DVS1 and DVS2 at the synchronous rectifier switches SR1 and SR2 and the drive signals GD1 and GD2 for the synchronous rectifier switches SR1 and SR2.

Figure 5:
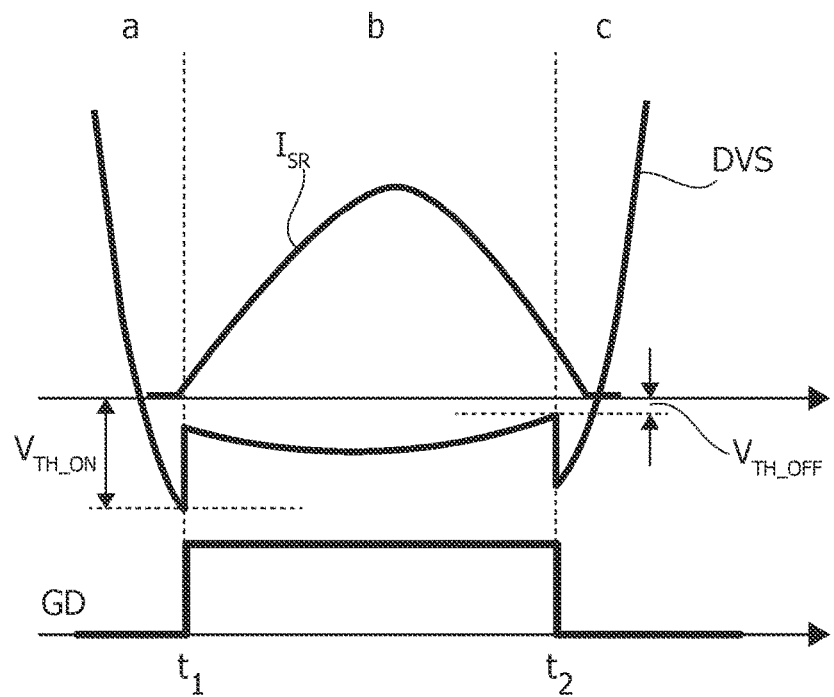

Moreover, FIG. 5 shows a detailed view of the current $I_{SR1}$ and $I_{SR2}$ flowing through one of the synchronous rectifier switches SR1 and SR2 and the respective voltage DVS and drive signal GD.

The waveforms show that the secondary winding T2 provides substantially a sine wave, wherein during a first half-period should be closed the synchronous rectifier switch SR1 (with SR2 opened) and during a second half-period should be closed the synchronous rectifier switch SR2 (with SR1 opened).

Each of the half-periods may thus be divided into three zones (a), (b) and (c).

During the first zone (a), i.e., before the synchronous rectifier switch is turned on (i.e., with the respective signal GD being low), the voltage DVS decreases, becomes negative and the respective diode starts conducting at a given threshold $V_{TH\_ON}$ (more or less at −0.7 V, corresponding to the forward voltage of the diode).

Once the synchronous rectifier switch SR is switched on at an instant $t_1$, the following zone (b) starts. During, this zone (b) the voltage DVS drops to:

$$DVS = R_{DSON} \cdot I_{SR} \quad (1)$$

where $R_{DSON}$ corresponds to the switch-on resistance of the synchronous rectifier switch SR. Accordingly, the voltage DVS has a sinusoidal behavior during this zone (and considering the direction of the current $I_{RS}$ and voltage DVS, opposed to the current $I_{RS}$).

Thus, during the zone (b), the voltage decreases and then increases again. Accordingly, when the current $I_{RS}$ approaches again zero, the synchronous rectifier switch SR may be switched off when the voltage DVS reaches a given second threshold $V_{TH\_OFF}$.

Once, the synchronous rectifier switch SR is switched off (and assuming that the winding is still conducting), the voltage DVS drops again to the forward voltage of the diode (approximately −0.7 V). The voltage DVS then increases until the voltage at the transformer winding T2 reverses.

Accordingly, due to the higher voltage drop caused by the forward biasing of the diode turn-on (700 mV) compared to resistive voltage drop (usually in the range of 10-20 mV), power losses are much higher during phases (a) and (c) than during phase (b).

Figure 6:
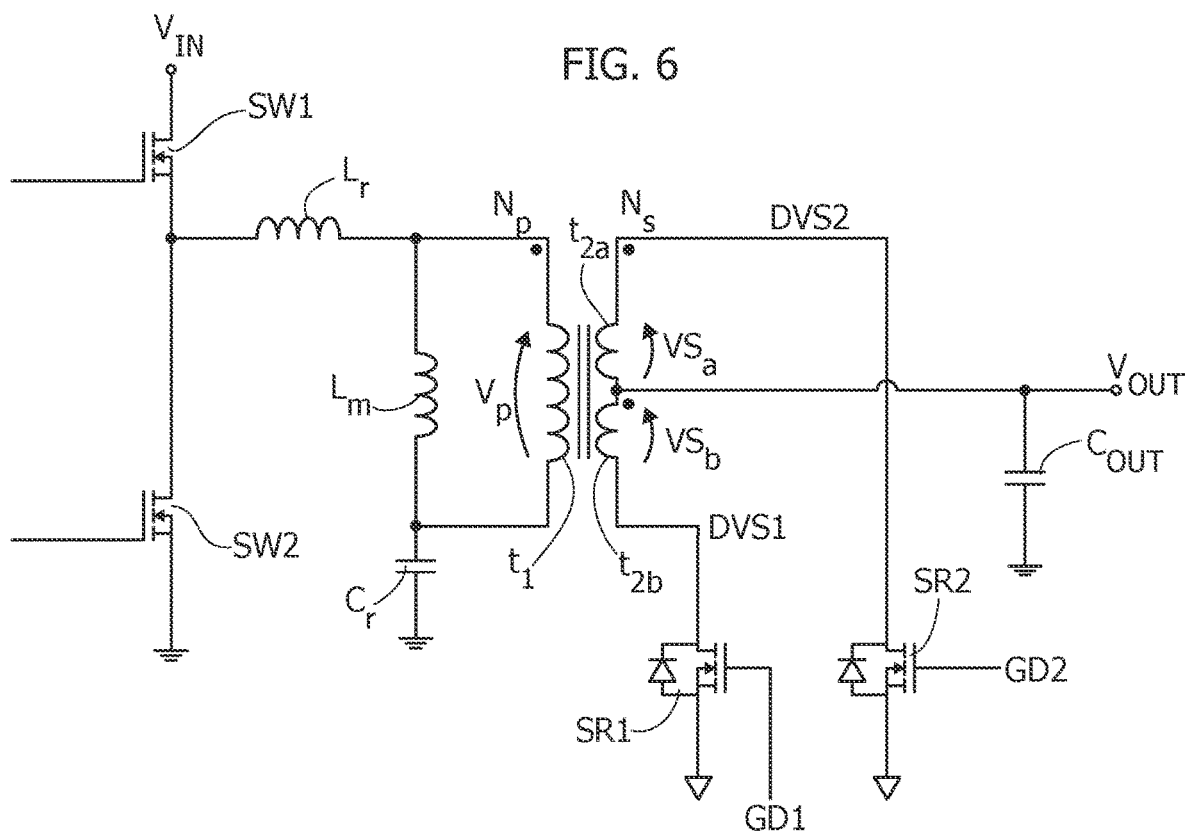
FIG. 6 shows a detailed view of the signals used to control the synchronous rectifier switches of FIG. 3.

FIG. 6, shows again the LLC converter schematic, wherein the voltage $V_P$ at the primary winding T1 and the voltages $V_{Sa}$ and $V_{Sb}$ at the secondary windings T2a and T2b are shown.

Generally, due to the coupling of the transformer, the voltages correspond to $V_{Sa}$ and $V_{Sb}$, i.e., $V_{Sa}=V_{Sb}=V_S$. Specifically, assuming a primary winding with $N_P$ windings and secondary windings with Ns windings, the voltage $V_S$ of each switching cycle may be determined as follows:

$$V_s = V_p \cdot \frac{N_s}{N_p} \quad (2)$$

Moreover, due to the connection the following relation applies:

$$-V_{Sa} + DVS2 = V_{Sb} + DVS1. \quad (3)$$

Thus, in steady state condition, i.e., when the capacitor $C_{OUT}$ is charged to the requested output voltage $V_{OUT}$, the maximum values for the voltages DVS1 and DVS2 are alternately:

during a first switching semi-period, the voltage drop DVS1 is neglectable and the voltage DVS2 corresponds to $2 \cdot V_{out}$; and during a second switching semi-period, the voltage drop DVS2 is neglectable and the voltage DVS1 corresponds to $2 \cdot V_{out}$.

Thus, this maximum value has to be taken into account in order to select the correct electronic switches for the synchronous rectifier switches SR1 and SR2.

Moreover, indeed, often spikes occur during the switching activity of the electronic converter. For example, such spikes are often generated by a current inversion in the previous cycle, and when the LLC converter works above resonance. These spikes imply, e.g., that a higher voltage class SR MOSFET with lower performance and higher cost has to be used.

In this respect, example solutions aimed to limit the voltage spikes by avoiding (or at least reducing) current inversions, which is however not always possible.

In FIGS. 7 to 17 described below, parts, elements or components that have already been described with reference to FIGS. 1 to 6 are designated by the same references used previously in these figures. The description of these elements has already been made and will not be repeated in what follows in order not to burden the present detailed description.

As explained in the foregoing, various embodiments of the present description concern solutions for determining the switch-off instant for switching off a synchronous rectifier switch.

As described with respect to equation (1), during each zone/time interval (b), the respective voltage DVS1 and DVS2 measured by the synchronous rectifier controller 222 is proportional to the switch on resistance $R_{DSON}$ of the respective synchronous rectifier switch SR1/SR2.

Figure 7:
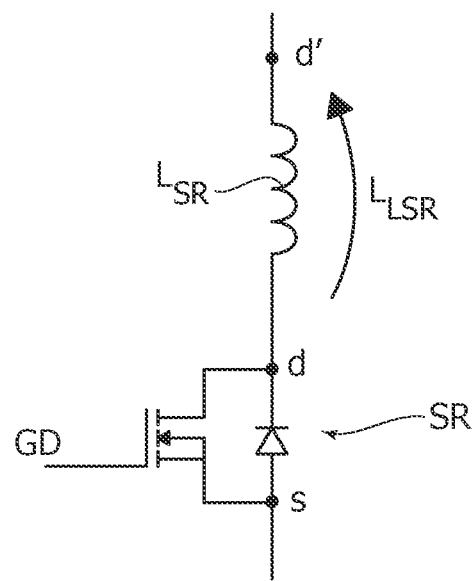
FIGS. 7, 8, 9 and 10 show an anticipative effect introduced by stray inductances in the circuit of FIG. 6.

However, the inventors have observed, and as also shown in FIG. 7, indeed the electronic circuit comprises also parasitic inductances, which may be modelled with an inductance $L_{SR}$ connected in series (with the current path of) the synchronous rectifier switch SR1/SR2, wherein the inductance $L_{SR}$ may be calculated as:

$$L_{RS} = L_{DS} + L_{TRACE}. \quad (4)$$

where $L_{DS}$ represents the inductance of the synchronous rectifier switch SR1/SR2 between the terminals (of the current path), e.g., between the drain and source terminals of a respective FET, and $L_{TRACE}$ represents an additional inductance of the traces of the printed circuit board for connecting the synchronous rectifier switch SR1/SR2 to the synchronous rectifier controller 222.

Thus, the synchronous rectifier controller 222 indeed monitors a voltage DVS', which does not correspond exactly to the voltage DVS at the terminals of the synchronous rectifier switch SR1/SR2, but:

$$DVS' = R_{DSON} \cdot I_{SR} + L_{RS} \cdot \frac{\delta I_{SR}}{\delta t}. \quad (5)$$

Figure 8:
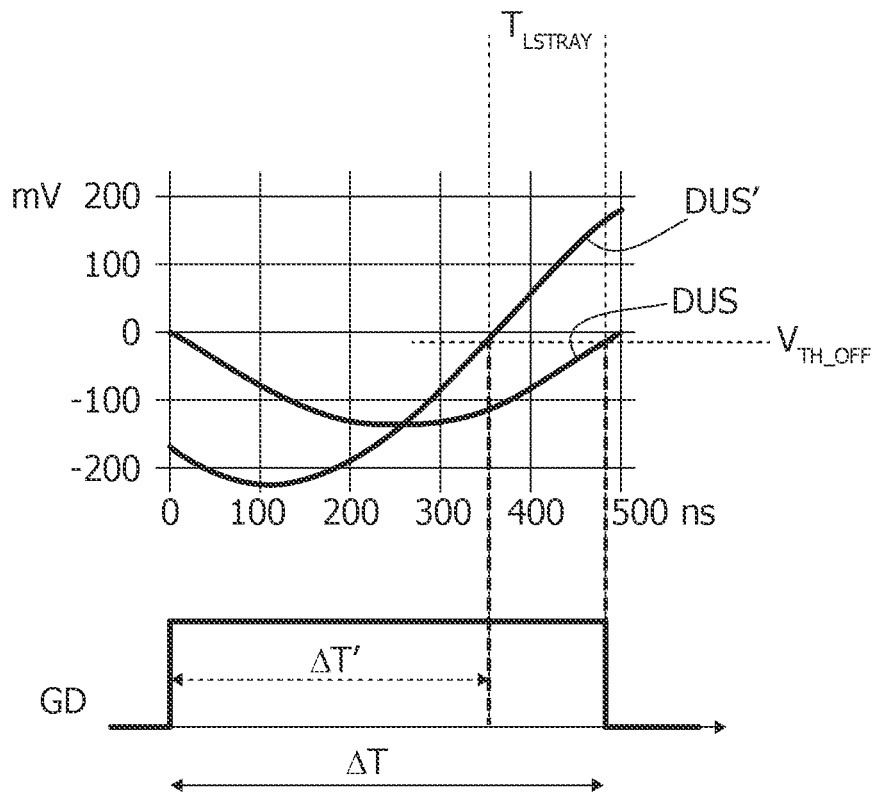

The inventors have observed, and as also shown in FIG. 8, this inductance $L_{SR}$ introduces an anticipative effect insofar as the synchronous rectifier controller 222 will determine, with respect to the start of the zone (b) (i.e., with respect to the rising edge of the signal GD), that the measured voltage DVS' reaches the switch-off threshold $V_{TH\_OFF}$ (see also FIG. 5) after a time $\Delta T'$ and not after the expected time $\Delta T$ when the voltage DVS indeed reaches the switch-off threshold $V_{TH\_OFF}$, with $\Delta T = \Delta T' + T_{LSRAY}$, i.e., the zero crossing of the voltage DVS' occurs before the zero crossing of the voltage DVS.

In a first approximation, this anticipative effect may be assumed to be constant, i.e., $T_{LSRAY}$ may be assumed to be constant. However, as will be described in greater detail in the following, this approximation may not be accurate enough.

In the following will now be discussed a possible approximation of this anticipative effect.

Specifically, in the following will be assumed that the current $I_S = I_{RS1} + I_{RS2}$ at the secondary side has a substantially sinusoidal shape during (at least the last part of) the switching cycle, i.e., at least at the end of the zone/interval (b), i.e.:

$$I_{SR}(t) = I_{PK} \cdot \sin(\omega_{SW} t) \quad (6)$$

where $I_{PK}$ represents the amplitude of the oscillation. For example, as described in the foregoing, this is often the case for (e.g., LLC) resonant converters, in particular when operating in the vicinity of the fundamental resonant frequency of the resonant tank of the converter.

In this condition, the measured voltage DVS' may be written (at least at the end of the zone (b) as:

$$DVS' = R_{DSON} \cdot I_{PK} \cdot \sin(\omega_{SW} t) + L_{RS} \cdot \omega_{SW} \cdot I_{PK} \cdot \cos(\omega_{SW} t) \quad (7)$$

The inventors have observed that this expression may be rewritten by splitting the time component and the phase shift component:

$$DVS' = K \cdot \sin(\omega_{SW} t - \varphi) = K \cdot \sin(\omega_{SW}(t - \varphi/\omega_{SW})) \quad (8)$$

where the time $T_{LRS}$ represents the $L_{RS}$ anticipation:

$$T_{LRS} = \varphi / \omega_{SW} \quad (9)$$

Equation (8) may further be reformulated:

$$DVS' = K \cdot \sin(\omega_{SW} t) \cdot \cos(\varphi) + K \cdot \cos(\omega_{SW} t) \cdot \sin(\varphi) \quad (10)$$

Finally, by comparing equation (7) with equation (10), it is possible to observe that:

$$K \cdot \sin(\varphi) = L_{RS} \cdot \omega_{SW} \cdot I_{PK}$$

$$K \cdot \cos(\varphi) = R_{DSON} \cdot I_{PK}$$

which permits to obtain the phase shift expression:

$$\varphi = \arctan\left(\frac{L_{RS}}{R_{DSON}} \omega_{SW}\right) \quad (11)$$

Thus, equation (9) may be reformulated as follows:

$$T_{LRS} = \frac{\varphi}{\omega_{SW}} = \frac{1}{\omega_{SW}} \arctan\left(\frac{L_{RS}}{R_{DSON}} \omega_{SW}\right) \quad (12)$$

Assuming that $L_{RS}/R_{DSON}$ is usually significantly smaller than $1/\omega_{SR}$ and assuming that the anticipation time $T_{LRS}$ is constant, equation (12) may be approximated:

$$T'_{LRS} \approx \frac{L_{RS}}{R_{DSON}} \quad (13)$$

Figure 9:
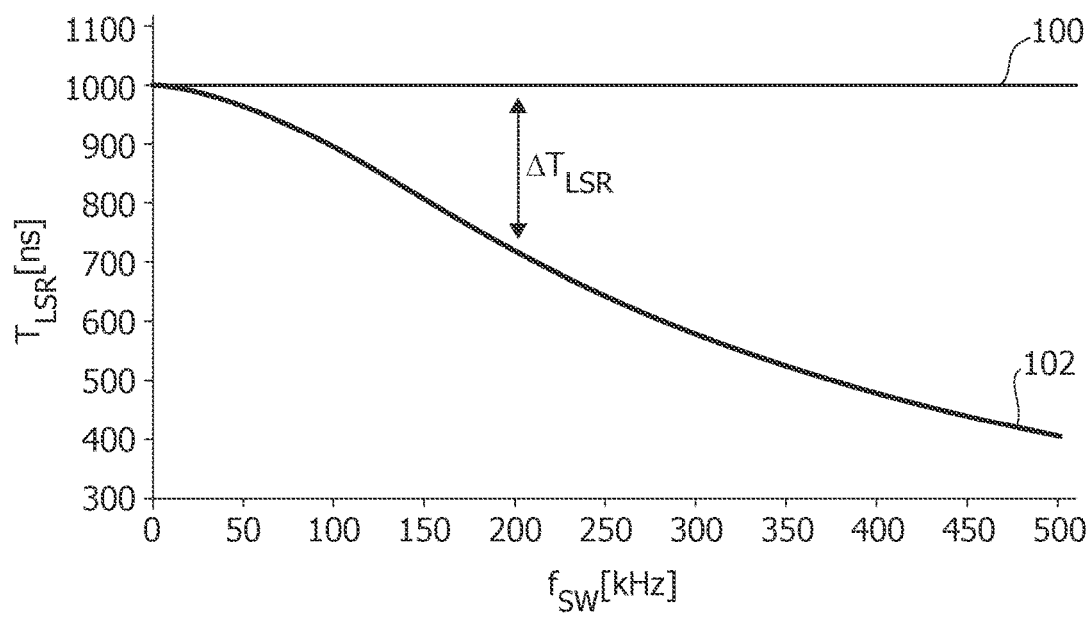

FIG. 9 shows an example of the anticipation time $T_{LRS}$ as a function of the switching frequency $f_{SW}$, for the exemplary case $L_{SR} = 4$ nH and $R_{DSON} = 4$ mΩ. Specifically, line 100 shows the behavior with the approximation of equation (13), and line 102 shows the behavior for equation (12), which thus takes also into account the switching frequency $f_{SW}$, with $\omega_{SR} = 2\pi f_{SW}$.

Thus, generally, an error $\Delta T_{LSR}$ exists for each frequency between the real value (line 102) and the approximation (line 100).

Figure 10:
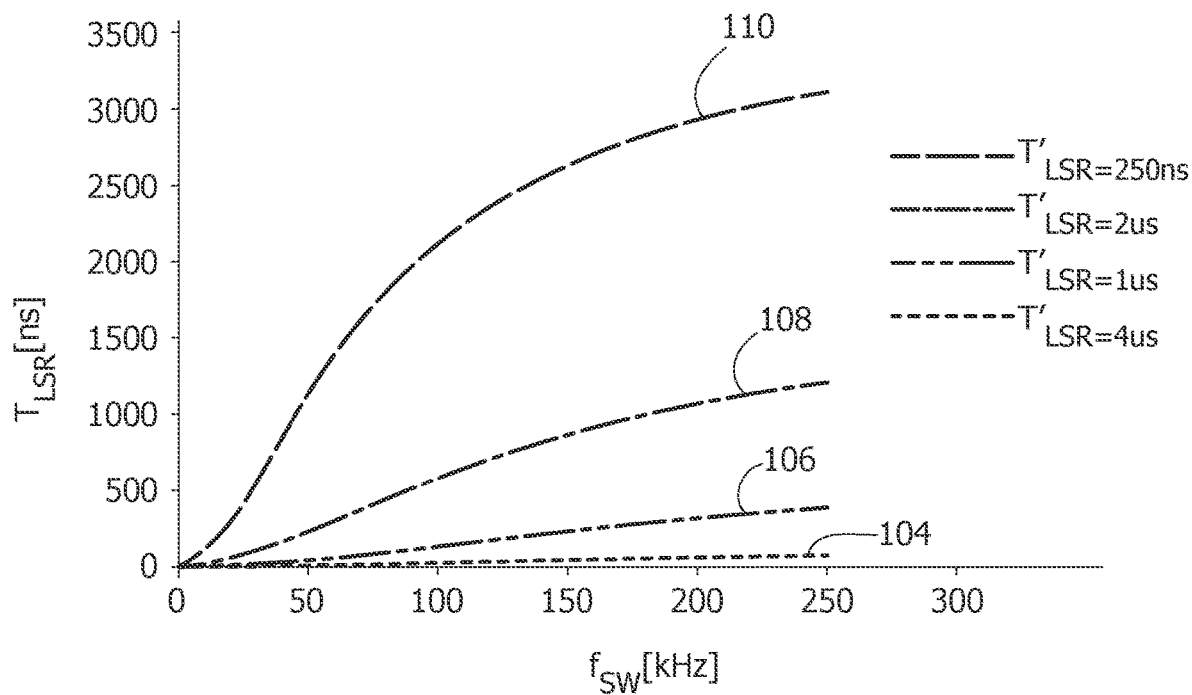

FIG. 10 shows in this respect examples of the error $T_{LSR}$ for different values $T_{LSR} = L_{RS}/R_{DSON}$. For example, lines 104, 106, 108 and 110 shows the behavior for $T'_{LSR} = 250$ ns, 1 s, 2 s and 4 s, respectively.

FIG. 10 also highlights that the simple approximation may lead to very high errors when the value $T'_{LSR}$ increases.

For example, after a high to low load current transient, the primary loop of the LLC converter (see e.g., FIG. 2) may increases the frequency to compensate the output voltage $V_{out}$ regulation. This frequency variation may result in a variation of the switching frequency in the order of 10%-15% causing a variation of the value $\Delta T_{LSR}$.

The inventors have observed that this variable anticipative effect should be taken into account when driving the synchronous rectifier switches SR1 and SR2.

In the following will now be described embodiments of a new driving method implemented within a synchronous rectifier controller/driver circuit 222a configured to drive two synchronous rectifier switches SR1 and SR2, such as the synchronous rectifier switches SR1 and SR2 of a (e.g., LLC) resonant converter as described with respect to FIGS. 1 to 6.

Specifically, in various embodiments, the synchronous rectifier driver circuit 222a is configured to drive the synchronous rectifier switches SR1 and SR2 by taking into account also the load current of the electronic (e.g., LLC) converter, i.e., the current $i_{out}$ provided to a load 30 (see FIG. 1).

Generally, also other solutions exist, which already take into the load current. For example, reference can be made to document US 2017/0085188 A1, which discloses a driver circuit for two synchronous rectifier switches SR1 and SR2. Substantially, this document describes a gate driving strategy for two synchronous rectifier MOSFET, which optimizes the conversion efficiency in all load conditions applying a constant voltage along all the conduction window.

Conversely, various embodiments of the present disclosure propose a new gate driving strategy, identified in the following as "DVS Shaping Gate Driving" (abbreviated as DVS SGD), which tries to reduce the current inversion as much as possible.

Specifically, in various embodiments, the synchronous rectifier driver circuit 222a is configured to change the drive voltage of the synchronous rectifier switches SR1 and SR2, e.g., the gate voltage of respective (e.g., n-channel) FETs, as a function of the instantaneous value of the voltage DVS rather than the average value of the voltage DVS as described in document US 2017/0085188 A1.

Specifically, by varying the amplitude of a drive signal GD (i.e., GD1 or GD2), the synchronous rectifier driver circuit 222a is able to change the switch-on resistance $R_{DSON}$ of the respective synchronous rectifier FET SR1 or SR2. Specifically, as shown in equations (12) and (13), the anticipation time $T_{LRS}$ decreases, when the switch-on resistance $R_{DSON}$ increases.

Thus, in various embodiments, the synchronous rectifier driver circuit 222a is configured to, when a given synchronous rectifier FET SR1 or SR2 is switched on, vary the drive signal GD, such that the switch-on resistance $R_{DSON}$ of the respective synchronous rectifier FET SR1 or SR2 increases at the end of the switch-on pulse, i.e., at the end of the interval/zone (b) (see also FIG. 5).

Figure 11A:
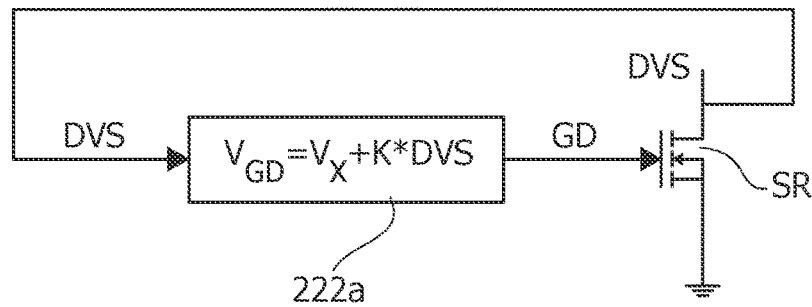
FIGS. 11A, 11B, 12, 13, 14 and 15 show various embodiments of a synchronous rectifier able to compensate the anticipative effect according to a first aspect of the present disclosure.

Specifically, as shown in FIG. 11A, in various embodiments, the drive the synchronous rectifier driver circuit 222a may be configured to vary the drive signal GD directly as a function of the voltage DVS (or more precisely the measure voltage DVS'):

$$GD = V_x + K \cdot |DVS'| \quad (14)$$

The above equation may be reformulated according to equation (5):

$$GD = V_x + K \cdot \left[ R_{DSON} \cdot I_{SR} + L_{RS} \cdot \frac{\delta I_{SR}}{\delta t} \right] \quad (15)$$

The inventors have observed that the resistance $R_{DSON}$ should be varied in order to obtain a voltage GD that tends towards the (constant offset) value $V_x$ when the current $I_{SR}$ approaches the zero crossing.

The effect of the inductance $L_{SR}$ helps to reduce the voltage GD, thereby increasing the resistance $R_{DSON}$, when the current $I_{SR}$ approaches zero. This permits to avoid (or at least reduce) current inversions, but at the expense of a small reduction of conversion efficiency.

In order to provide a design criterion independent from the value $L_{SR}$, its value will be hereinafter supposed to be zero, i.e.:

$$GD = V_x + K \cdot R_{DSON} \cdot I_{SR} \quad (16)$$

This assumption does not lack of generality, but actually helps to improve the immunity with respect to parasitic effects, which would lead to an anticipated switch of the synchronous rectifier FET. In fact, the inductance $L_{SR}$ only leads to a lower value GD than the one shown in equation (16), thereby increasing the actual switch-on resistance $R_{DSON}$ and voltage |DVS| for a given current $I_{SR}$.

FIG. 11A shows an embodiment of the operation of the synchronous rectifier driver circuit 222a for each of the synchronous rectifier FETs SR1 or SR2.

In general, due to the switching activity at the primary winding T1, the voltage DVS at a given synchronous rectifier FET SR1 or SR2 will become negative at an instant $t_0$.

In various embodiments, during this phase (a) the synchronous rectifier driver circuit 222a is configured to compare the voltage DVS with a threshold voltage $V_{TH\_ON}$. Considering the direction of the voltage DVS, this threshold voltage has a negative value. For example, for this purpose, the synchronous rectifier driver circuit 222a may comprise an analog comparator.

In the embodiment considered, when the voltage DVS reaches the threshold voltage $V_{TH\_ON}$ at the instant $t_1$ the synchronous rectifier driver circuit 222a generates the drive signal GD in order to close the synchronous rectifier FET SR1 or SR2.

As mentioned before, the disclosed control method is mainly used to determine the switch-off instant $t_2$.

In general, the synchronous rectifier driver circuit 222 may use equation (14) for the complete duration between the instants $t_1$ and $t_2$. However, in order to reduce switching losses, the synchronous rectifier driver circuit 222 may use a portion during phase (b), wherein the synchronous rectifier driver circuit 222 uses a constant or predetermined value for the drive signal GD.

For example, in various embodiments, the synchronous rectifier driver circuit 222 is configured to use:
  a first mode M1, wherein the synchronous rectifier driver circuit 222 sets the drive signal GD to a given (constant or predetermined) value; and
  a second mode, wherein the synchronous rectifier driver circuit 222 varies the drive signal GD as a function of the signal DVS.

Specifically, in various embodiments, the synchronous rectifier driver circuit 222 uses mode M2 between an instant $t_3$ during phase (b) and the instant $t_2$. Conversely, the synchronous rectifier driver circuit 222 may be configured to use during the remaining initial portion of phase (b) (between the instants $t_1$ and $t_3$):
  only mode M1 (between the instants $t_1$ and $t_3$), or
  first mode M2 (between the instant $t_1$ and an instant $t_4$) and then mode M1 (between the instants $t_4$ and $t_3$).

For example, in various embodiments, the synchronous rectifier driver circuit 222 may be configured to determine the instant $t_3$ by:
  adding a constant or predetermined time interval to the instant $t_1$; or
  determining when the absolute value of the voltage DVS decreases and reaches a given threshold value.

Similarly, the synchronous rectifier driver circuit 222 may be configured to determine the instant $t_4$ by:
  adding a constant or predetermined time interval to the instant $t_1$; or
  determining when the absolute value of the voltage DVS increases and reaches the given threshold value.

Figure 11B:
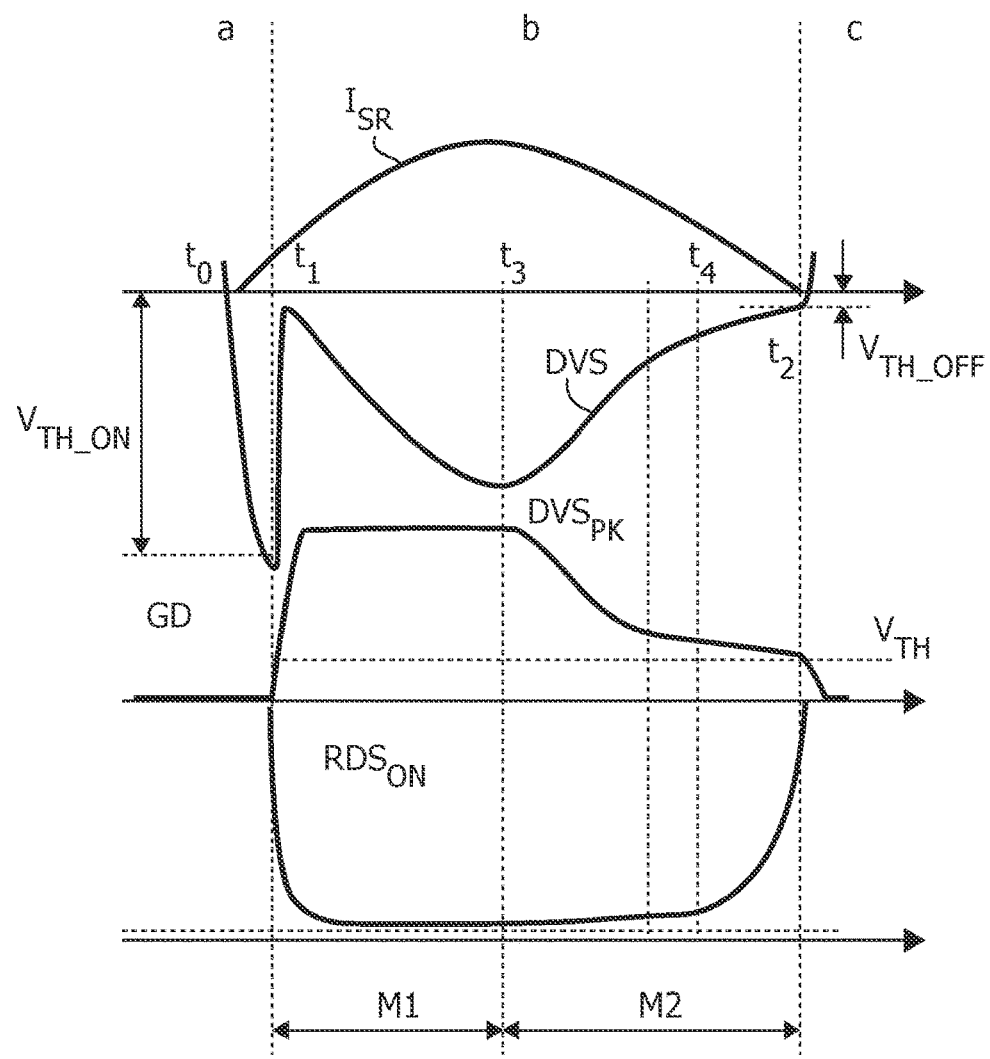

For example, as shown in FIG. 11B, between the instants $t_1$ and $t_2$ the current $I_{SR}$ will have a sinusoidal or partially sinusoidal behavior and will reach a peak value at an instant $t_3$. Similarly, the measured voltage DVS will reach a peak value $DVS_{PK}$ at a given instant.

Specifically, in the embodiments considered, the synchronous rectifier driver circuit 222a uses this instant for the instant $t_3$. Accordingly, in various embodiments, the synchronous rectifier driver circuit 222a is configured to determine or estimate this instant $t_3$. For example, the synchronous rectifier driver circuit 222a may be configured to:
  determine the instant $t_3$ by detecting the instant when the signal DVS reaches its peak value $DVS_{PK}$; or
  determine the middle of a given switching half-period and use this instant for the instant $t_3$; or
  determine the instant $t_3$ by detecting an instant when the signal DVS reaches a given (preferably fixed) threshold voltage, such as −40 mV.

For example, the synchronous rectifier driver circuit 222a may determine the middle of a given switching half-period by:
  receiving a trigger signal from the circuit 210;
  monitoring the drive signals for the switches SW1 and SW2; or
  determine the duration between the switch-on instant $t_1$ and the switch-off instant $t_2$ and calculate the instant $t_3(k)$ for a given cycle k as:

$$t_3(k) = t_1(k) + (t_2(k-1) - t_1(k-1))/2.$$

Specifically, in the embodiment considered, the synchronous rectifier driver circuit 222a is configured to generate the drive signal GD with two modes:
  between the switch-on instant $t_1$ and the detected/estimated instant $t_3$ with the first mode M1, and
  between the detected/estimated instant $t_3$ and the switch-off instant $t_2$ with the second mode M2.

Specifically, as mentioned before, in various embodiments, the synchronous rectifier driver circuit 222a sets during the first mode M1 the drive signal GD to a given constant voltage, such 3 V or in general a voltage being greater than the switch-off threshold $V_{TH\_OFF}$ of the synchronous rectifier FET SR1 or SR2.

Specifically, in various embodiments, the synchronous rectifier driver circuit 222a sets during the first mode M1 the drive signal GD to:

$$GD = V_x + K \cdot |DVS'_{PK}|$$

In various embodiments, the value $DVS'_{PK}$ may correspond to one of:
  the peak value $DVS_{PK}$ of a previous switching cycle, or a filtered version thereof, such as the average value of the peak value $DVS_{PK}$ for a plurality of switching cycles; or
  a sampled version of the signal DVS at the instant $t_3$ of a previous switching cycle, or a filtered version thereof, such as the average value of the value $DVS(t_3)$ for a plurality of switching cycles.

Conversely, during the second mode M2, the synchronous rectifier driver circuit 222a varies the signal GD as shown in equation (15).

The above operation is also shown in FIG. 11B, wherein:
  the voltage GD is constant between the switch-on instant $t_1$ and the detected/estimated instant $t_3$,
  the voltage GD then decreases proportionally with the voltage DVS until the voltage DVS reaches the threshold voltage $V_{TH}$ of the synchronous rectifier FET SR1 or SR2 at the instant $t_2$ and the synchronous rectifier FET SR1 or SR2 is switched off.

FIG. 11B also shows that the switch-on resistance $RDS_{ON}$ of the synchronous rectifier FET SR1 or SR remains substantially constant between the switch-on instant $t_1$ and an instant $t_4$ and then increases significantly near the switch-off instant $t_2$.

As mentioned before, in various embodiments, the synchronous rectifier driver circuit 222a sets the signal GD to zero after the instant $t_2$ where the voltage DVS reaches the threshold VTH_OFF. In order to deal also with the turn-off phase before the current $I_{SR}$ becomes positive, equation (14) may be modified to include a term A V:

$$GD = V_x - \Delta V + K \cdot |DVS'|. \qquad (17)$$

Thus, in various embodiments, three variables $V_x$, K and $\Delta V$ have to be selected. For example, in various embodiments, a series of design criteria are taken into account.

Generally, the value of the switch-on resistance $R_{DSON}$ has to be increased when the current $I_{SR}$ is approaching the zero crossing. Thus, essentially, when $I_{SR}$ approaches zero ($I_{SR} \to 0$), the voltage GD should correspond to a given value $V_{TH}$, which is sufficient to switch the synchronous rectifier FET on with a high $R_{SDSON}$, i.e.:

$$GD = V_{TH} = x. \qquad (18)$$

This condition should be satisfied also in the worst conditions, when the threshold voltage $V_{TH}$ of the FET has it minimum value $V_{TH,min}$. For example, the minimum value $V_{TH,min}$ has to take into account temperature drift and technological spreads, i.e.:

$$GD = V_{TH,min} = V_x. \qquad (19)$$

Moreover, in order to guarantee a proper immunity from parasitic effects when $GD = V_{TH,min}$, the amplitude of the voltage DVS (i.e., |DVS|) should not be smaller than a given minimum value $DVS_{sat}$, i.e., in the worst case:

$$GD = V_{TH,min} - \Delta V + K \cdot |DVS_{sat}|. \qquad (20)$$

Thus, by combining equations (18) and (20):

$$\Delta V = K \cdot |DVS_{sat}|. \qquad (21)$$

The inventors have observed that the value $DVS_{sat}$ should be chosen as a trade-off between noise immunity and circuitry speed. A higher value $DVS_{sat}$ offers better immunity to noise (less anticipated turn-offs) and it requires a lower change rate capability for the signal GD.

Moreover, the signal GD should have its maximum value $GD_{max}$ when the voltage |DVS| becomes higher than a ratio $\alpha$ of a given maximum value $|DVS_{max}|$ in order to maximize the converter efficiency. Usually, the maximum value $GD_{max}$ depends on the supply voltage VCC of the synchronous rectifier driver circuit 222a and possible voltage drops $V_{DROP}$ used to generate the signal GD, i.e., $GD_{max} = VCC - V_{DROP}$.

In various embodiments, the value $DVS_{max}$ is determined taking into account the switch-on resistance $R_{DSON}$ and the maximum power supply.

For example, based on equations (17), (18) and (20):

$$GD_{max} = V_{TH,min} - \Delta V + K \cdot |\alpha \cdot DVS_{max}| \qquad (22)$$

$$GD_{max} = V_{TH,min} - K \cdot |DVS_{sat}| + K \cdot |\alpha \cdot DVS_{max}| \qquad (23)$$

$$GD_{max} = V_{TH,min} + K \cdot (|\alpha \cdot DVS_{max}| - |DVS_{sat}|) \qquad (24)$$

Thus, the parameter K can be calculated as:

$$K = \frac{GD_{max} - V_{TH,min}}{|\alpha \cdot DVS_{max}| - |DVS_{sat}|} \qquad (25)$$

Summarizing the above equations, in various embodiments, the parameters $V_x$, K and $\Delta V$ are selected as follows:

$$V_x = V_{TH,min}$$

$$K = \frac{GD_{max} - V_{TH,min}}{|\alpha \cdot DVS_{max}| - |DVS_{sat}|} \qquad (26)$$

$$\Delta V = K \cdot |DVS_{sat}|$$

For example, assuming synchronous rectifier MOSFETs SR1 and SR2 being IPP084N06L4 transistors, these transistors have a switch-on resistance $R_{DSON}$ of 8.1 mΩ and a typical threshold value $V_{TH\_TYP}$ of 2.7 V having a spread $\Delta V_{spread\_from\_DS}$ of 0.5 V. Thus, the minimum threshold value $V_{TH,min}$ may be calculated as 2.7 V−0.5 V=2.2 V ($V_{TH\_TYP} - \Delta V_{spread\_from\_DS}$).

Moreover, assuming a supply voltage VCC of 12 V and a voltage drop $V_{DROP}$ of 1 V, the maximum drive voltage is $GD_{max}$ is 11 V.

Finally, by selecting $|DVS_{sat}|$ as 4 mV, $|DVS_{max}|$ as 100 mV and $\alpha$ as 0.5, the parameters may be calculated according to equation (26): $V_x$=2.2 V K=191 and $\Delta V$=764 mV.

As shown in the foregoing, most of the used parameters depend on the application, i.e., the operation parameters of the electronic converter, such as the supply voltage VCC, the voltage-drop $V_{DROP}$ in the synchronous rectifier driver circuit 222a, and also the parameters $|DVS_{sat}|$ and $|DVS_{max}|$ and may be fixed. Thus, in various embodiments, the driver circuit 222a is configured to permit a setting/programming of the minimum threshold value $V_{TH,min}$, for example in order to permit a use of different synchronous rectifier FETs.

In fact, assuming that the transistor has its maximum threshold value $(V_{TH\_TYP}+\Delta V_{spread\_from\_DS})$ of 3.2 V, and the above parameters $V_x$, K and $\Delta V$, the driver circuit would operate with a minimum value $|DVS_{sat}|$ of 9.2 mV (and the maximum value $GD_{max}$ remains unchanged), which is still acceptable for a proper FET turn-off and conversion efficiency.

Thus, as mentioned before, in various embodiments, the driver circuit 222a is configured to permit a setting of the minimum threshold value $V_{TH,min}$ of at least one (and preferably both) the synchronous rectifier switch SR1 and SR2.

Figure 12:
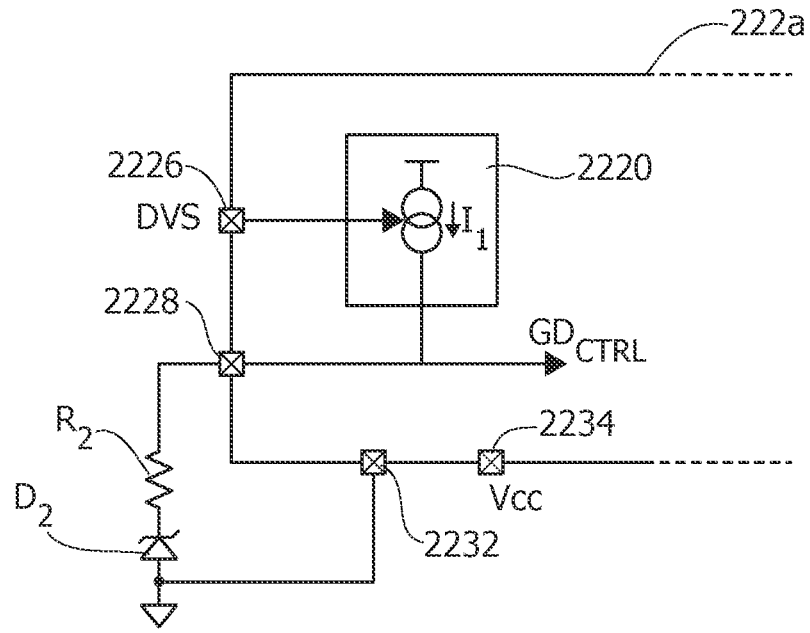
Figure 13:
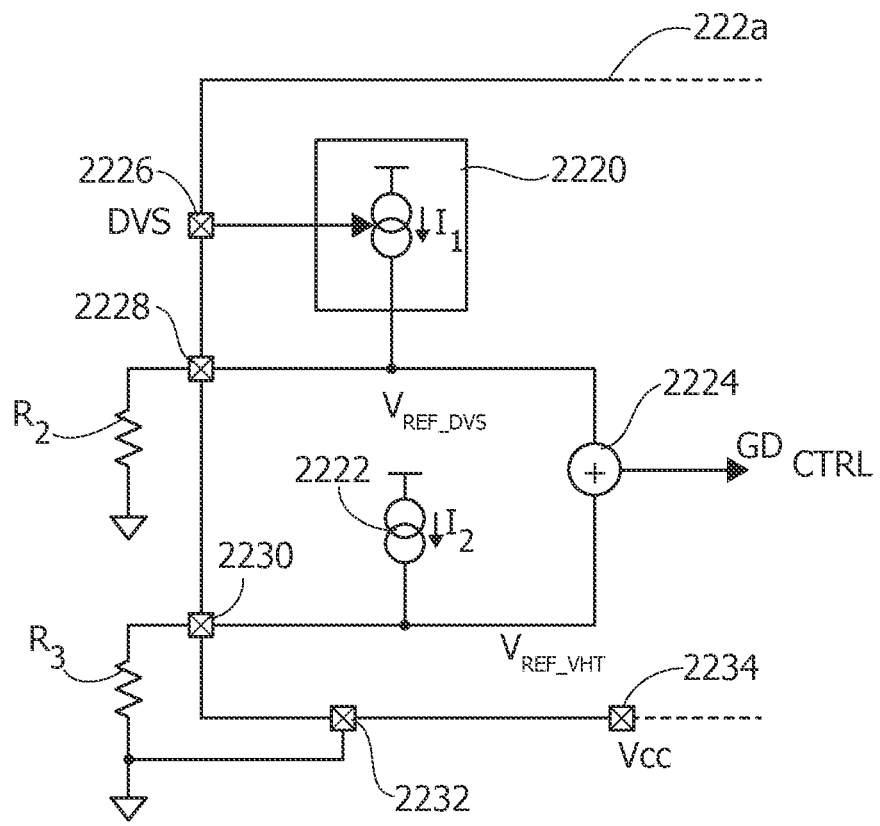
Figure 14:
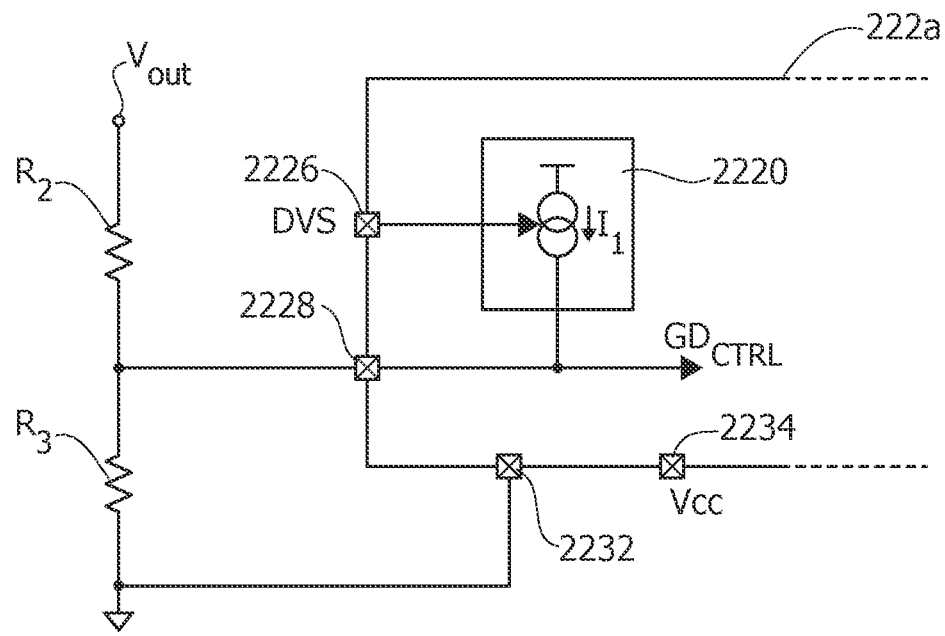

Embodiments of analog solutions are shown in FIGS. 12, 13 and 14. The selection of one of the embodiments may depend, e.g., on the number of pins to be used by the package of the synchronous rectifier driver 222a and on the minimum for the parameter $V_{TH,min}$ to be settable.

Generally, in the embodiments shown, the synchronous rectifier driver circuit 222a is configured to generate the signal $GD_{CTRL}$ indicative of (e.g., proportional to or corresponding to) the amplitude of the signal GD to be applied to the gate terminal of a synchronous rectifier switch (e.g., SR1) as a function of the voltage DVS (or more precisely the measure voltage DVS') between the drain and source terminal of the synchronous rectifier switch (e.g., SR1). Accordingly, when using a synchronous rectifier driver circuit 222a being integrated in an integrated circuit, the integrated circuit may comprise:

a terminal 2232 configured to be connected to a ground, such as the ground GND2 shown in FIG. 3;
a terminal 2234 configured to be connected to a supply voltage VCC;
a terminal 2226 configured to be connected to the drain terminal of the synchronous rectifier switch, thereby receiving the voltage DVS insofar as the source terminal of the synchronous rectifier switch is connected to ground, i.e., the terminal 2232; and
a terminal (see also FIG. 3) configured to be connected to the gate terminal of the synchronous rectifier switch, whereby the signal GD is applied to this terminal.

Thus, when driving two synchronous rectifier switches SR1 and SR2 with the same synchronous rectifier driver circuit 222a, this circuit 222a includes two of the circuits shown in FIGS. 12 and 13.

In the embodiments, the synchronous rectifier driver circuit 222a comprises a variable current generator 2220 configured to generate a current $I_1$ as a function of (the instantaneous value of) the voltage DVS (DVS'), e.g., the voltage received at the terminal 2226. Specifically, in various embodiments, the current $I_1$ is proportional to the voltage DVS:

$$I_1 = \frac{1}{R_1}|DVS| \quad (27)$$

Figure 15:
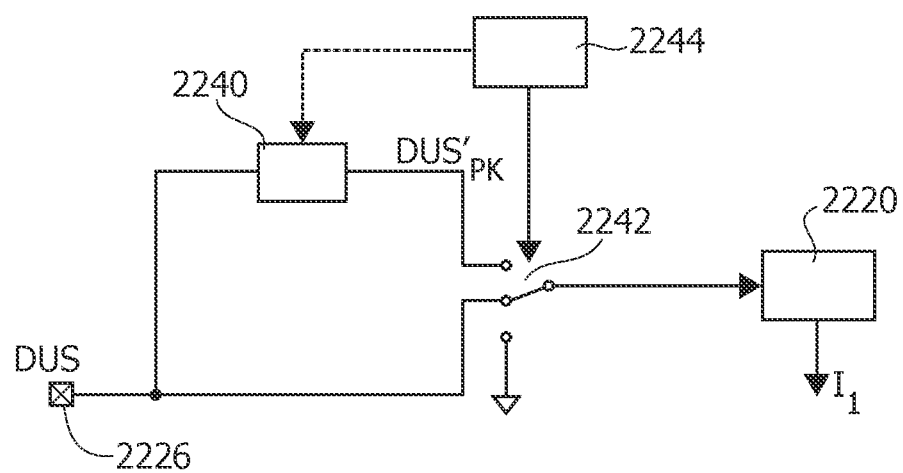

As mentioned before, the synchronous rectifier driver circuit 222a may indeed use two modes M1 and M2 during given periods of the phase (b). For example, as shown in FIG. 15, the synchronous rectifier driver circuit 222a may comprise for this purpose:

a sample-and-hold circuit 2240 configured to sample the value $DVS'_{PK}$;
an electronic switch 2242 configured to selectively provide to the variable current generator 2220 the current value DVS, the value $DVS'_{PK}$ or a zero voltage; and
a control circuit 2244 configured to drive the electronic switch 2242.

For example, the sample-and-hold circuit 2240 may be implemented with an analog peak detector, or a sample-and-hold circuit configured to sample the signal DVS in response to a trigger signal provided by the control circuit 2244, wherein the trigger signal signals the instant $t_3$.

In line with the previous description, the control circuit 2244 may be configured to provide to the variable current generator 2220 via the electronic switch 2242:

between the instants $t_1$ and $t_3$, the value $DVS'_{PK}$ provided by the sample-and-hold circuit 2240;
between the instant $t_3$ and one of the instants $t_2$, the value DVS received at the pin 2226; and
after the instant $t_2$ (and until the next instant $t_1$) the zero voltage.

For this purpose, the control circuit 2244 may be configure to:

determine the switch-on instant $t_1$, e.g., by comparing via a first comparator the signal DVS with the threshold $V_{TH\_ON}$;
determine the instant $t_3$, as described in the foregoing; and
determine the switch-off instant $t_2$, e.g., by comparing via a second comparator the signal DVS with the threshold $V_{TH\_OFF}$.

The speed of the second comparator should be high in order to avoid an inversion of the current $I_{SR}$. In fact, thanks to the reduction of the $L_{SR}$ anticipation, the switch-off instant $t_2$ is now very close to the zero crossing of the current $I_{SR}$.

In FIG. 12, the output of the current generator 2220 is connected (e.g., directly) to node 2228, which in turn is connected (e.g., directly) to a first terminal of a resistor $R_2$ and the second terminal of the resistor $R_2$ is connected (e.g., directly) via a Zener diode Dz to ground/terminal 2232. In various embodiments, the resistor $R_2$ and/or the Zener diode Dz may be external with respect to the integrated circuit of the synchronous rectifier driver circuit 222a. For example, for this purpose, the node 2228 may be a terminal of such an integrated circuit and the resistor $R_2$ and the Zener diode Dz may be connected in series between the terminal 2228 and the terminal 2232.

Thus, in FIG. 12, the signal $GD_{CTRL}$ corresponds to:

$$GD_{CTRL} = V_{DZ} + \frac{R_2}{R_1}|DVS| \quad (28)$$

where $V_{DZ}$ corresponds to the Zener voltage of the diode Dz.

In this case, by comparing equations (28) and (26), the following relations may be obtained:

$$V_{DZ} = V_{TH,min} - \Delta V, \quad (29)$$

$$K = \frac{R_2}{R_1}$$

For example, for the above exemplary values, $V_{Dz}$ would have to correspond to 1.436 V.

Conversely, in FIG. 13, the output of the current generator 2220 is again connected (e.g., directly) to node 2228, which in turn is connected (e.g., directly) to a first terminal of a resistor $R_2$ and the second terminal of the resistor $R_2$ is connected (e.g., directly) to ground/terminal 2232. Also in this case, the resistor $R_2$ may be external with respect to the integrated circuit of the synchronous rectifier driver circuit 222a, i.e., the node 2228 may be a terminal of such an integrated circuit and the resistor $R_2$ may be connected between the terminal 2228 and the terminal 2232.

Accordingly, in the embodiment considered, the following voltage $V_{REF\_DVS}$ is generated at the node 2228:

$$V_{REF\_DVS} = \frac{R_2}{R_1}|DVS| \qquad (30)$$

Moreover, in the embodiment considered, the synchronous rectifier driver circuit 222a comprises a second current generator 2222 configured to generate a (constant, but optionally settable/programmable) current $I_2$.

In the embodiment considered, the output of the current generator 2222 is connected (e.g., directly) to node 2230, which in turn is connected (e.g., directly) to a first terminal of a resistor $R_3$ and the second terminal of the resistor $R_3$ is connected (e.g., directly) to ground/terminal 2232. Also the resistor $R_3$ may be external with respect to the integrated circuit of the synchronous rectifier driver circuit 222a, i.e., the node 2230 may be a terminal of such an integrated circuit and the resistor $R_3$ may be connected between the terminal 2230 and the terminal 2232.

Accordingly, in the embodiment considered, the following voltage $V_{REF\_VTH}$ is generated at the node 2230:

$$V_{REF\_VTH} = R_3 \cdot I_2 \qquad (31)$$

In the embodiment considered, the voltage $V_{REF\_DVS}$ and $V_{REF\_VTH}$ are provided to a voltage adder circuit 2224, which provides at output the signal $GD_{CTRL}$, i.e.:

$$GD_{CTRL} = V_{REF\_DVS} + V_{REF\_VTH} \qquad (32)$$

$$GD_{CTRL} = R_3 \cdot I_2 + \frac{R_1}{R_3}|DVS| \qquad (33)$$

Thus, assuming that the current $I_2$ is constant, the following relations may be obtained:

$$R_3 \cdot I_2 = V_{TH,min} - \Delta V, \qquad (34)$$

$$K = \frac{R_2}{R_1}$$

For example, for the above exemplary values, $R_3 \cdot I_2$ would have to correspond to 1.436 V.

Finally, in the embodiment shown in FIG. 14, the output of the current generator 2220 is connected again (e.g., directly) to node 2228. In the embodiment considered, the node 2228 is connected (e.g., directly) via a first resistor $R_2$ to the output voltage Vout/node 202a and via a second resistor $R_3$ to ground GND, e.g., node 202b. In various embodiments, the resistors $R_2$ and/or $R_3$ may be external with respect to the integrated circuit of the synchronous rectifier driver circuit 222a. For example, for this purpose, the node 2228 may be a terminal of such an integrated circuit and the resistors $R_2$ and $R_3$ may be connected in series between the terminals 202a and 202b, wherein the intermediate node between the resistors $R_2$ and $R_3$ is connected to the terminal 2228. Generally, instead of using the output voltage Vout, the resistors $R_2$ and $R_3$ may also be connected between any other (substantially) constant voltage.

Accordingly, in the embodiment considered, the voltage at the node 2228 (corresponding to the voltage $GD_{CTRL}$) may be expressed similar to equation (32) as follows:

$$GD_{CTRL} = V_{REF\_DVS} + V_{REF\_VTH} \qquad (35)$$

where the first term $V_{REF\_DVS}$ may be solved as:

$$V_{REF\_DVS} = V_{out} \cdot R_3 (R_2 + R_3) \qquad (36)$$

and the second term $V_{REF\_DTH}$ may be solved as:

$$V_{REF\_DTH} = I_1 \cdot (R_2/R_3) = (DVS/R_1)(R_2/R_3) \qquad (37)$$

Thus, in view of equation (14), the following correspondences may be determined:

$$V_x = V_{out} \cdot R_3 (R_2 + R_3) \qquad (38)$$

and $$K = (R_2/R_3)/R_1 \qquad (39)$$

Thus, from a circuit point of view, the integrated circuit of the synchronous rectifier driver circuit 222a shown in FIG. 14 may correspond to the integrated circuit of the synchronous rectifier driver circuit 222a shown in FIG. 12, but only the connection of external components may change. Thus, the integrated circuit may support both connections.

Accordingly, the circuits shown with respect to FIGS. 12 to 15 provide low-complexity solutions for varying the signal GD as a function of the voltage DVS, wherein the signal GD may optionally be set to a constant value, e.g., determined as a function of the peak value $DVS_{PK}$.

The DVS SGD technique has several advantages, such as:
the current inversion occurrence is reduced, because when the synchronous rectifier FET is driven near to the threshold voltage $V_{TH}$, the switch-on resistance $R_{DSON}$ is increased, thereby reducing the anticipation effect of the inductance $L_{RS}$, i.e., the instant of zero-voltage crossing of the signal DVS corresponds to a zero-current instant of the current flowing through the synchronous rectifier FET;
the associated effects of current inversions, such as DVS spikes, are reduced, e.g., because even with a late turn-off of the synchronous rectifier FET (i.e., with current inversion):
1) the high switch-on resistance $R_{DSON}$ does not allow to have a high reverse current in the transformer secondary windings; and
2) the load current $I_{out}$ still flows through the synchronous rectifier FET channel and not through the diode associated with the synchronous rectifier FET body diode, i.e., there is no diode reverse recovery charge whose effect is to reverse charging the transformer secondary side windings.

The above described turn-off methodology has some drawbacks that should be taken into account.

The DVS SGD technique does not aim to obtain a shape of the signal GD able to keep the voltage DVS almost constant while the current $I_{SR}$ approaches zero. Such approach would require a "true" closed loop driving of the synchronous rectifier switches.

The DVS SGD technique simply requires that the voltage GD is determined as a function of the (instantaneous value of the) signal DVS. However, this variation of the signal GD implies that the switch-on resistance varies and thus the signal DVS itself. In fact, as shown in FIG. 11, a feedback loop indeed exists and is closed via the synchronous rectifier switch SR. This loop implies that any change to the signal GD (or DVS) has an effect on the signal DVS (or GD) too.

This may result in oscillations (noise) propagated from the signal DVS signal to the signal GD. In various embodiments, a (e.g., low-pass) filter circuit may thus be provided:
- between the drain terminal of the synchronous rectifier switch SR and the input node 2226 of the driver circuit 22a; and/or
- between the signal GD and the gate terminal of the synchronous rectifier switch SR.

Generally, the amount of filtering should not be too high, insofar as this would introduce a high delay e.g., between the actual voltage DVS (pre-filter) and the measure voltage DVS' (post-filter).

Moreover, when the stray inductance $L_{SR}$ is big, still a premature turn-off of the synchronous rectifier switch SR may occur, resulting in a high current $I_{SR}$ flowing through the diode associated with the synchronous rectifier switch SR, leading to a diode reverse recovering charge and subsequent DVS spike. However, compared to the comparative example solution, this effect is still reduced and by choosing a lower value for the parameter K the loop stability may be improved.

However, lowering the parameter K implies that the desired final value $DVS_{sat}$ (e.g., 4 mV of the previous design examples) has to be obtained with a smaller voltage GD (higher value for $R_{DSON}$). Such a lower voltage GD may require a more complex driver circuit of the synchronous rectifier switch SR.

Figure 16:
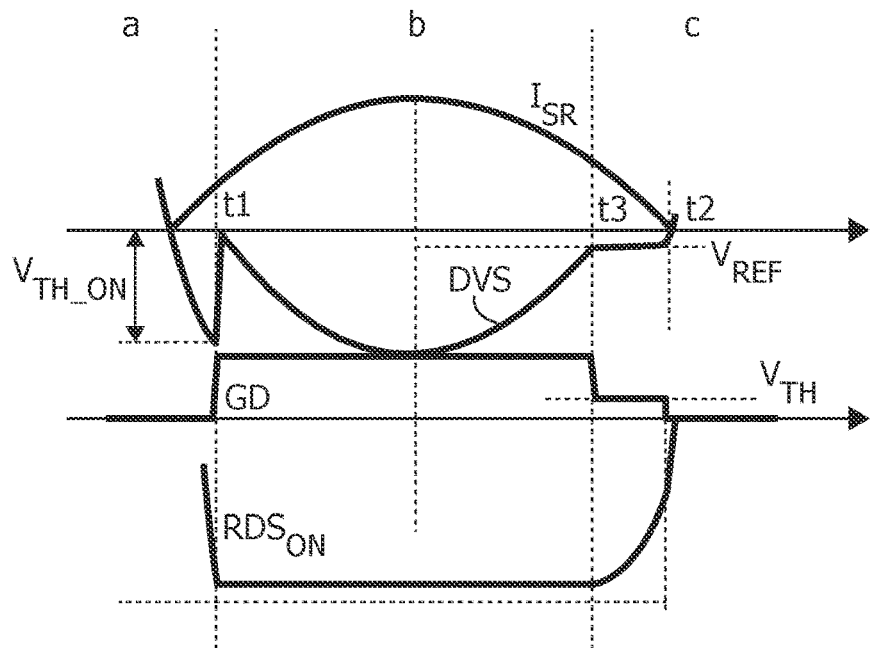
FIGS. 16 and 17 show various embodiments of a synchronous rectifier able to compensate the anticipative effect according to a second aspect of the present disclosure.

FIG. 16 shows a further embodiment, wherein the synchronous rectifier driver circuit 222a uses a closed loop control of the voltage DVS.

As mentioned before, the synchronous rectifier driver circuit 222a is configured to use, at least during the last portion of the phase (b), a mode M1, wherein the synchronous rectifier driver circuit 222a varies the voltage GD as a function of the voltage DVS. For example, in the embodiment considered, the synchronous rectifier driver circuit 222a uses again two modes:
- a mode M2 between the start of the phase (b) at the instant $t_1$ and an instant $t_3$; and
- a mode M1 between the instant $t_3$ and the end of the phase (b) at the an instant $t_2$.

Specifically, during mode M2, the synchronous rectifier driver circuit 222a sets the voltage GD to a given constant (fixed or predetermined) value. Accordingly, in this case, the voltage DVS will have a shape corresponding to the current $I_{SR}$.

In the embodiment considered, the synchronous rectifier driver circuit 222a is configured to determine the instant $t_3$ by detecting whether the absolute value of the voltage DVS decreases and reaches a given threshold voltage $V_{REF}$. Specifically, once the voltage DVS decreases and reaches a given threshold voltage $V_{REF}$, the synchronous rectifier driver circuit 222a switches to mode M1, where the synchronous rectifier driver circuit 222a varies the voltage GD as a function of the voltage DVS.

Specifically, in the embodiment considered, the synchronous rectifier driver circuit 222a is configured to vary the voltage GD in order to keep the voltage DVS constant, i.e., in order to maintain the voltage DVS at the value of $V_{REF}$. Generally, due to the fact that the current $I_{SR}$ continuous to decrease, the synchronous rectifier driver circuit 222a has to increase the switch on resistance $RDS_{ON}$, i.e., the synchronous rectifier driver circuit 222a has to reduce the drive signal GD, until the drive signal GD falls below the threshold voltage $V_{TH}$ of the FET and the FET is opened, which corresponds to the instant $t_2$.

Figure 17:
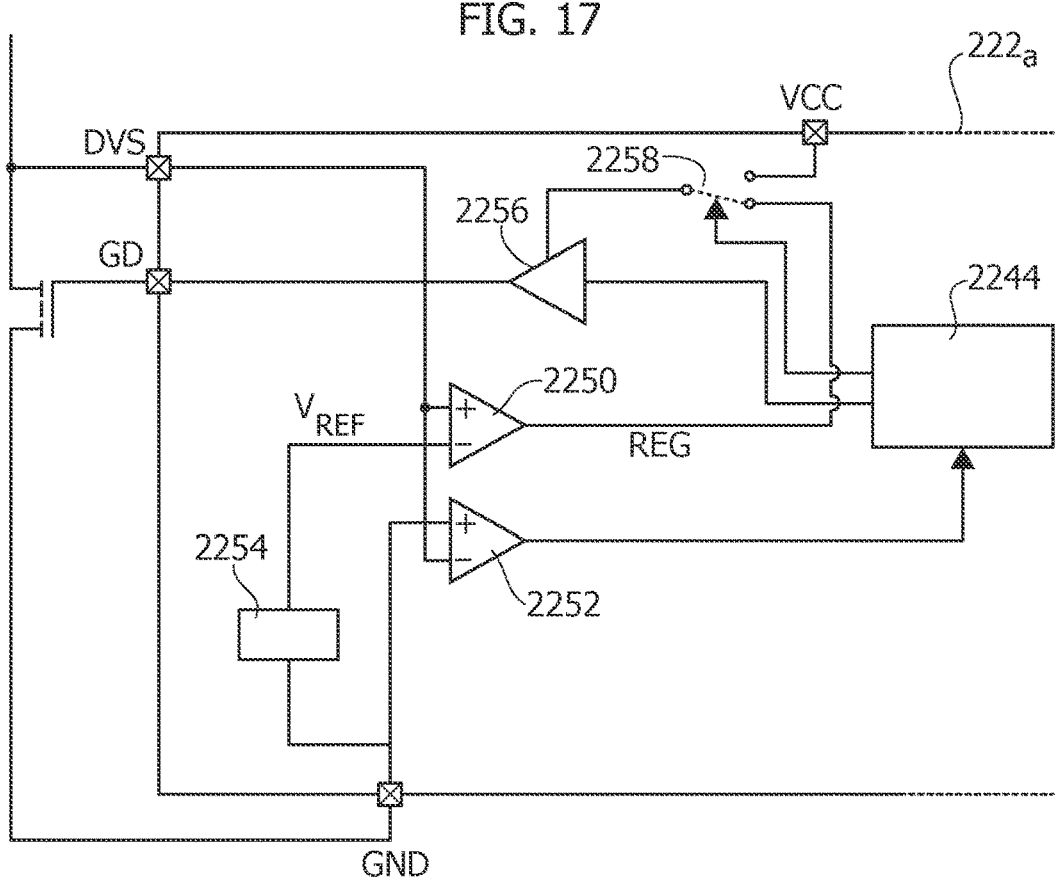

FIG. 17 shows a possible embodiment of the synchronous rectifier driver circuit 222a operating as shown in FIG. 16.

As mentioned before, in this case, the synchronous rectifier driver circuit 222a is configured to use during mode M1 a closed loop control for the drive signal GD in order to keep the voltage DVS constant. In order to keep the voltage DVS constant, the synchronous rectifier driver circuit 222a comprises thus a closed feedback loop, which compares the voltage DVS with the threshold voltage $V_{REF}$. The voltage $V_{REF}$ at which the feedback loop regulates should be chosen in range $0 > V_{REF} > DVS_{PK}$, e.g., in range of between 10% and 30% of $DVS_{PK}$. For example, the reference/threshold voltage $V_{REF}$ may be provided by a voltage reference 2254. The reference voltage $V_{REG}$ may be obtained also as a fraction of maximum DVS voltage $DVS_{PK}$ during the phase b, via a digital core and a digital-to-analog converter, an external reference supply, components connected externally to the integrated circuit comprising the synchronous rectifier driver circuit 222a, etc.

For example, in the embodiment considered, the feedback loop comprises a (digital and/or analog) regulator circuit 2250 receiving at input the signals DVS and $V_{REF}$, and generating at output a regulation signal REG. Specifically, in various embodiments, the regulator circuit 2250 comprises at least an Integral (I) component, and optionally a Proportion (P) and/or Derivative (D) component. For example, an analog regulator circuit 2250 may be implemented with an operational amplifier having associates a respective feedback network, e.g., comprising at least a capacitor for the Integral component. In various embodiments, the inputs and/or the outputs of the regulator circuit 2250 may have associates filter circuits, e.g., low-pass filters configured to filter noise in the voltage DVS measurement and/or the signal GD. The speed of the filters should be chosen, such that the dynamic of gate voltage control can be maintained.

Accordingly, in the embodiment considered, the signal GD may be generated as a function of the signal REG. For example, in case the synchronous rectifier driver circuit 222a also supports mode M2, the synchronous rectifier driver circuit 222a may be configured to use as voltage GD:
- in mode M2, a constant voltage, e.g., Vcc; and
- in mode M1, the signal REG.

Specifically, as mentioned before, the control circuit 2244 should also be able to set the signal GD to zero once the phase (b) ends, i.e., when the voltage DVS falls to zero. Accordingly, in various embodiments, the synchronous rectifier driver circuit 222a is configured to selectively apply to the terminal GD:
- the constant voltage (mode M2), when the voltage DVS reaches the switch-on threshold $V_{TH\_ON}$ (instant $t_1$);
- the signal REG voltage (mode M1), when the voltage DVS reaches the threshold $V_{REF}$ (instant $t_3$); or
- zero (in response to detecting the instant $t_2$)

For example, in the embodiment considered, the synchronous rectifier driver circuit 222a comprises for this purpose a switching circuit 2256 and 2258, and a control circuit 2244. For example, in various embodiments, the control circuit 2244 is configured to monitor the voltage DVS and drive the switching circuit 2256 and 2258 in order to select (in sequence):
- the constant voltage (mode M2), when the voltage DVS reaches the switch-on threshold $V_{TH\_ON}$ (instant $t_1$);
- the signal REG (mode M1), when the voltage DVS reaches the threshold $V_{REF}$ (instant $t_3$); and zero, when the voltage DVS reaches zero (instant $t_2$).

For example, as schematically shown, the last condition may be verified via a zero-voltage comparator 2252.

FIG. 17 also shows a possible embodiment of the switching circuit. Specifically, in the embodiment considered, the switching circuit comprises a multiplexer 2258, schematically shown via an electronic switch. Accordingly, in the embodiment considered, the control circuit 2244 may drive the multiplexer 2256 in order to switch between modes M1 and M2. In the embodiment considered, the signal at the output of the multiplexer 2256 is thus not used directly as signal GD, but the synchronous rectifier driver circuit 222a comprises a circuit 2256 configured to select either the signal at the output of the multiplexer 2256 or a zero voltage.

For example, in the embodiment considered, the synchronous rectifier driver circuit 222a comprises a driver circuit 2256, wherein the driver circuit 2256 receives as supply voltage the signal at the output of the multiplexer 2256, which thus corresponds to the maximum output voltage of the driver circuit 2256, and the input of the driver circuit 2256 is driven by the control circuit 2244, which thus may set the signal GD to zero or to the signal at the output of the multiplexer 2256.

Accordingly, once the control circuit 2244 detects that the voltage DVS reaches the threshold $V_{TH\_ON}$ (instant $t_1$), the control circuit 2244 drives the switching circuit 2256/2258 in order to apply to the terminal GD a constant voltage (full drive voltage). Next, once the control circuit 2244 detects that the voltage DVS reaches the voltage $V_{REF}$ (instant $t_3$), the control circuit 2244 drives the switching circuit 2256/2258 in order to apply to the terminal GD the signal REG, thereby activating the gate voltage shaping. Finally, once the control circuit 2244 detects that the voltage DVS reaches zero (instant $t_2$), the control circuit 2244 drives the switching circuit 2256/2258 in order to apply to the terminal GD a zero voltage.

Accordingly, from the instant $t_3$ the voltage DVS is kept constant by decreasing the signal GD. As mentioned before, the control circuit 2244 could also be configured to detect the instant $t_3$ by:

determining the instant when the voltage DVS reaches a peak value $DVS_{PK}$, or waiting for a given time with respect to the instant $t_1$.

Alternatively, the synchronous rectifier driver circuit 222a could also support only mode M1 and use always the gate voltage shaping, thereby reducing the complexity of the circuit.

Of course, without prejudice to the principle of the disclosure, the details of construction and the embodiments may vary widely with respect to what has been described and illustrated herein purely by way of example, without thereby departing from the scope of the present disclosure.

A synchronous rectifier driver circuit (222a) configured to drive a synchronous rectifier FET (SR1, SR2) comprising a drain, a source and a gate terminal, may be summarized as including: a first terminal (2232) configured to be connected to the source terminal of said synchronous rectifier FET (SR1, SR2); a second terminal (2226) configured to be connected to the drain terminal of said synchronous rectifier FET (SR1, SR2); a third terminal (GD) configured to be connected to the gate terminal of said synchronous rectifier FET (SR1, SR2); wherein said synchronous rectifier driver circuit (222a) may be configured to: measure the voltage (DVS) between said second terminal (2226) and said first terminal (2232), detect a switch-on instant ($t_1$) wherein said measured voltage (DVS) reaches a first threshold value ($V_{TH\_ON}$); detect a switch-off instant ($t_2$) wherein said measured voltage (DVS) reaches a second threshold value ($V_{TH\_OFF}$); generate a drive signal (GD) between said third terminal (GD) and said first terminal (2232) as a function of said measured voltage (DVS) by: between a further instant ($t_3$) and said switch-off instant ($t_2$), varying said drive signal (GD) as a function of the instantaneous value of said measured voltage (DVS); and between said switch-off instant ($t_2$) and the next switch-on instant ($t_1$), setting said drive signal (GD) to a first value.

Said synchronous rectifier driver circuit (222a) may be configured to, between said switch-on instant ($t_1$) and said further instant ($t_3$), set said drive signal (GD) to a second value. Said synchronous rectifier driver circuit (222a) may be configured to determine said further instant ($t_3$) by: determining an instant ($t_3$) where said measured voltage (DVS) reaches a peak value ($DVS_{PK}$) between said switch-on instant ($t_1$) and said switch-off instant ($t_2$); waiting a given time from said switch-on instant ($t_1$); or determining an instant ($t_3$) where said measured voltage (DVS) reaches a given threshold value ($V_{REF}$). Said synchronous rectifier driver circuit (222a) may be configured to determine the instant where said measured voltage reaches said peak value ($DVS_{PK}$) by: determining the duration between a previous switch-on instant ($t_1$) and a respective previous switch-off instant ($t_2$) and estimating said further instant ($t_3$) at half of said duration. Said synchronous rectifier driver circuit (222a) may be configured to vary said drive signal (GD) between said further instant ($t_3$) and said switch-off instant ($t_2$) by setting said drive signal (GD) to a voltage corresponding to the sum of a constant voltage ($V_x$, $\Delta V$) and a voltage proportional with a given proportionality constant (K) to said instantaneous value of said measured voltage (DVS). Said synchronous rectifier driver circuit (222a) may include a sample-and-hold circuit (2240) configured to store said peak value ($DVS_{PK}$), and wherein said synchronous rectifier driver circuit (222a) is configured to determine said second value as a function of said stored peak value ($DVS_{PK}$). The second value may correspond to the sum of said constant voltage ($V_x$, $\Delta V$) and a voltage proportional with said given proportionality constant (K) to said stored peak value ($DVS_{PK}$).

The synchronous rectifier driver circuit may include: a fourth terminal (2228); a variable current generator (2220) configured to generate a variable current ($I_1$) applied to said fourth terminal (2228), wherein said variable current ($I_1$) may be proportionate to a voltage received at an input of said variable current generator (2220); and a control circuit (2242, 2244) configured to connect said input of said variable current generator (2220) to: said stored peak value ($DVS_{PK}$) between said switch-on instant ($t_1$) and said further instant ($t_3$), said measured voltage (DVS) between said further instant ($t_3$) and said switch-off instant ($t_2$); and said first terminal (2232) between said switch-off instant ($t_2$) and the next switch-on instant ($t_1$).

The voltage at said fourth terminal (2228) may reproduce said drive signal (GD).

The synchronous rectifier driver circuit (222a) may include: a fifth terminal (2230); a constant current generator (2220) configured to generate a constant current ($I_2$) applied to said fifth terminal (2230); and a summation circuit (2224) configured to generate said drive signal (GD) by summing the voltage at said fourth terminal (2228) and the voltage at said fifth terminal (2230). Said synchronous rectifier driver circuit (222a) may be configured to vary said drive signal (GD) between said further instant ($t_3$) and said switch-off instant ($t_2$) in order to regulate (2250) said measured voltage (DVS) to a given reference value ($V_{REF}$). Said synchronous rectifier driver circuit (222a) may include: a regulator circuit (2250) configured to receive at input said measured voltage (DVS) and said given reference value ($V_{REF}$), and generate at output a regulation signal (REG), wherein said regulator circuit (2250) may include at least an Integral component, and wherein said drive signal (GD) is determined (2244, 2256, 2258) between said further instant ($t_3$) and said switch-off instant ($t_2$) as a function of said regulation signal (REG).

An integrated circuit may be summarized as a synchronous rectifier driver circuit (222a) as described above.

An electronic resonant converter (20) may be summarized as including: two input terminals (200a, 200b) for receiving an input voltage and two output terminals (202a, 202b) for providing an output voltage (Vout) or output current (iout); a transformer (T) including a primary winding and a first (T2a) and a second (T2b) secondary winding; a switching stage (SW1, SW2) connected via a resonant tank (Cr, Ls, Lp) to said primary winding; a first synchronous rectifier FET (SR1) connected in series with said first secondary winding (T2a) between said two output terminals (202a, 202b); a second synchronous rectifier FET (SR1) connected in series with said second secondary winding (T2b) between said two output terminals (202a, 202b); and two synchronous rectifier driver circuits (222a).

A method of operating a synchronous rectifier driver circuit (222a) may be summarized as including: measuring the voltage (DVS) between said second terminal (2226) and said first terminal (2232); detecting a switch-on instant ($t_1$) wherein said measured voltage (DVS) reaches a first threshold value ($V_{TH\_ON}$); detecting a switch-off instant ($t_2$) wherein said measured voltage (DVS) may reach a second threshold value ($V_{TH\_OFF}$); generating a drive signal (GD) between said third terminal (GD) and said first terminal (2232) as a function of said measured voltage (DVS) by: between a further instant ($t_3$) and said switch-off instant ($t_2$), varying said drive signal (GD) as a function of the instantaneous value of said measured voltage (DVS); and between said switch-off instant ($t_2$) and the next switch-on instant ($t_1$), setting said drive signal (GD) to a first value.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A synchronous rectifier driver circuit configured to drive a synchronous rectifier FET including a drain, a source and a gate terminal, said synchronous rectifier driver circuit comprising:
a first terminal configured to be connected to the source terminal of said synchronous rectifier FET;
a second terminal configured to be connected to the drain terminal of said synchronous rectifier FET;
a third terminal configured to be connected to the gate terminal of said synchronous rectifier FET;
wherein said synchronous rectifier driver circuit is configured to:
measure a voltage between said second terminal and said first terminal;
detect a switch-on instant wherein said measured voltage reaches a first threshold value;
detect a switch-off instant wherein said measured voltage reaches a second threshold value;
generate a drive signal between said third terminal and said first terminal as a function of said measured voltage by:
between a further instant and said switch-off instant, varying said drive signal as a function of the instantaneous value of said measured voltage; and
between said switch-off instant and the next switch-on instant, setting said drive signal to a first value, and
wherein said synchronous rectifier driver circuit is configured to:
determine said further instant by determining an instant where said measured voltage reaches a peak value between said switch-on instant and said switch-off instant; and
between said switch-on instant and said further instant, set said drive signal to a second value, wherein said synchronous rectifier driver circuit includes a sample-and-hold circuit configured to store said peak value, and wherein said synchronous rectifier driver circuit is configured to determine said second value as a function of said stored peak value.

2. The synchronous rectifier driver circuit according to claim 1, wherein said synchronous rectifier driver circuit is configured to:
between said switch-on instant and said further instant, set said drive signal to a second value.

3. The synchronous rectifier driver circuit according to claim 1, wherein in response to said synchronous rectifier driver circuit determining said further instant by determining the instant where said measured voltage reaches said peak value between said switch-on instant and said switch-off instant, the synchronous rectifier driver circuit is configured to:
determine the duration between a previous switch-on instant and a respective previous switch-off instant and estimate said further instant at half of said duration.

4. The synchronous rectifier driver circuit according to claim 1, wherein said synchronous rectifier driver circuit is configured to vary said drive signal between said further instant and said switch-off instant by setting said drive signal to a voltage corresponding to the sum of a constant voltage and a voltage proportional with a given proportionality constant to said instantaneous value of said measured voltage.

5. The synchronous rectifier driver circuit according to claim 1, wherein the second value corresponds to a sum of a constant voltage and a voltage proportional with a given proportionality constant to said stored peak value.

6. The synchronous rectifier driver circuit according to claim 1, comprising:
a fourth terminal;
a variable current generator configured to generate a variable current applied to said fourth terminal, wherein said variable current is proportional to a voltage received at an input of said variable current generator; and
a control circuit configured to connect said input of said variable current generator to:
said stored peak value between said switch-on instant and said further instant,
said measured voltage between said further instant and said switch-off instant; and
said first terminal between said switch-off instant and the next switch-on instant.

7. The synchronous rectifier driver circuit according to claim 6, wherein the voltage at said fourth terminal reproduces said drive signal.

8. The synchronous rectifier driver circuit according to claim 6, comprising:
a fifth terminal;
a constant current generator configured to generate a constant current applied to said fifth terminal; and
a summation circuit configured to generate said drive signal by summing the voltage at said fourth terminal and the voltage at said fifth terminal.

9. The synchronous rectifier driver circuit according to claim 1, wherein said synchronous rectifier driver circuit is configured to vary said drive signal between said further instant and said switch-off instant in order to regulate said measured voltage to a given reference value.

10. The synchronous rectifier driver circuit according to claim 9, wherein said synchronous rectifier driver circuit comprises:
a regulator circuit configured to receive at input said measured voltage and said given reference value, and generate at output a regulation signal, wherein said regulator circuit comprises at least an Integral component, and wherein said drive signal is determined between said further instant and said switch-off instant as a function of said regulation signal.

11. An integrated circuit comprising a synchronous rectifier driver circuit according to claim 1.

12. An electronic resonant converter comprising:
two input terminals for receiving an input voltage and two output terminals for providing an output voltage or output current;
a transformer including a primary winding and a first and a second secondary winding;
a switching stage connected via a resonant tank to said primary winding;
a first synchronous rectifier FET connected in series with said first secondary winding between said two output terminals;
a second synchronous rectifier FET connected in series with said second secondary winding between said two output terminals; and
two synchronous rectifier driver circuits, each of the synchronous rectifier driver circuits configured to drive a respective one of the first or second synchronous rectifier FETs including a drain, a source and a gate terminal, and including:
a first terminal configured to be connected to the source terminal of said synchronous rectifier FET;
a second terminal configured to be connected to the drain terminal of said synchronous rectifier FET;
a third terminal configured to be connected to the gate terminal of said synchronous rectifier FET;
wherein said synchronous rectifier driver circuit is configured to:
measure a voltage between said second terminal and said first terminal;
detect a switch-on instant wherein said measured voltage reaches a first threshold value;
detect a switch-off instant wherein said measured voltage reaches a second threshold value;
generate a drive signal between said third terminal and said first terminal as a function of said measured voltage by:
between a further instant and said switch-off instant, varying said drive signal as a function of the instantaneous value of said measured voltage; and
between said switch-off instant and the next switch-on instant, setting said drive signal to a first value, and
wherein said synchronous rectifier driver circuit is configured to:
determine said further instant by determining an instant where said measured voltage reaches a peak value between said switch-on instant and said switch-off instant; and
between said switch-on instant and said further instant, set said drive signal to a second value, wherein said synchronous rectifier driver circuit includes a sample-and-hold circuit configured to store said peak value, and wherein said synchronous rectifier driver circuit is configured to determine said second value as a function of said stored peak value.

13. The electronic resonant converter according to claim 12, wherein said synchronous rectifier driver circuit is configured to:
between said switch-on instant and said further instant, set said drive signal to a second value.

14. The electronic resonant converter according to claim 12, wherein in response to said synchronous rectifier driver circuit determining said further instant by determining the instant where said measured voltage reaches said peak value between said switch-on instant and said switch-off instant, the synchronous rectifier driver circuit is configured to:
determine the duration between a previous switch-on instant and a respective previous switch-off instant and estimating said further instant at half of said duration.

15. A method of operating a synchronous rectifier driver circuit,
wherein said synchronous rectifier driver circuit includes a first terminal configured to be connected to a source terminal of a synchronous rectifier FET; a second terminal configured to be connected to a drain terminal of said synchronous rectifier FET; a third terminal configured to be connected to a gate terminal of said synchronous rectifier FET, and
the method comprises:
measuring a voltage between said second terminal and said first terminal;
detecting a switch-on instant wherein said measured voltage reaches a first threshold value;
detecting a switch-off instant wherein said measured voltage reaches a second threshold value;
generating a drive signal between said third terminal and said first terminal as a function of said measured voltage by:
between a further instant and said switch-off instant, varying said drive signal as a function of the instantaneous value of said measured voltage; and
between said switch-off instant and the next switch-on instant, setting said drive signal to a first value;
determining said further instant by determining an instant where said measured voltage reaches a peak value between said switch-on instant and said switch-off instant;
between said switch-on instant and said further instant, setting said drive signal to a second value;
storing, by a sample-and-hold circuit of said synchronous rectifier driver circuit, said peak value; and determining said second value as a function of said stored peak value.

16. The method according to claim 15, further comprising:
determining the duration between a previous switch-on instant and a respective previous switch-off instant and estimating said further instant at half of said duration.

\* \* \* \* \*